(12) United States Patent
Namikawa et al.

(10) Patent No.: US 11,840,296 B2
(45) Date of Patent: Dec. 12, 2023

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Isao Namikawa, Okazaki (JP); Satoshi Matsuda, Okazaki (JP); Tomoyuki Iida, Nisshin (JP); Yoshio Kudo, Machida (JP); Masaharu Yamashita, Toyota (JP); Kenji Shibata, Nagoya (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 17/481,989

(22) Filed: Sep. 22, 2021

(65) Prior Publication Data

US 2022/0089217 A1 Mar. 24, 2022

(30) Foreign Application Priority Data

Sep. 24, 2020 (JP) ................................. 2020-159591
Dec. 14, 2020 (JP) ................................. 2020-207051

(51) Int. Cl.
*B62D 6/00* (2006.01)
*B62D 5/04* (2006.01)
*B62D 6/08* (2006.01)

(52) U.S. Cl.
CPC ........... *B62D 6/008* (2013.01); *B62D 5/0463* (2013.01); *B62D 6/002* (2013.01); *B62D 6/08* (2013.01)

(58) Field of Classification Search
CPC ...... B62D 6/008; B62D 5/0463; B62D 5/001; B62D 5/005; B62D 6/002; B62D 6/08; B62D 5/0469; B62D 6/00
See application file for complete search history.

(56) References Cited

U.S. PATENT DOCUMENTS

| 6,213,248 | B1 | 4/2001 | Kawaguchi et al. |
| 2004/0193344 | A1* | 9/2004 | Suzuki ............... B60T 8/885 180/443 |
| 2019/0367083 | A1* | 12/2019 | Kodera ............... B62D 6/04 |

FOREIGN PATENT DOCUMENTS

| EP | 3 569 475 A1 | 11/2019 |
| JP | H10-217998 A | 8/1998 |
| JP | 2019-127217 A | 8/2019 |

OTHER PUBLICATIONS

Feb. 16, 2022 Extended European Search Report issued in European Patent Application No. 21197998.4.

\* cited by examiner

*Primary Examiner* — Adam R Mott
*Assistant Examiner* — Erick T. Detweiler
(74) *Attorney, Agent, or Firm* — Oliff PLC

(57) ABSTRACT

A steering control device includes a control unit configured to control at least an operation of a steering-side motor. The control unit is configured to calculate a target reaction torque; calculate a difference axial force that is used to limit steering for turning the turning wheels in a predetermined direction, the difference axial force being reflected in the target reaction torque; and set a reference angle to one of a steering angle and a turning angle, set a converted angle to an angle obtained by converting another of the steering angle and the turning angle according to a steering angle ratio, and calculate the difference axial force based on a difference between the reference angle and the converted angle.

13 Claims, 6 Drawing Sheets

STEERING CONTROL DEVICE

CROSS-REFERENCE TO RELATED APPLICATION

This application claims priority to Japanese Patent Application No. 2020-159591 filed on Sep. 24, 2020 and Japanese Patent Application No. 2020-207051 filed on Dec. 14, 2020, each incorporated herein by reference in its entirety.

BACKGROUND

1. Technical Field

The disclosure relates to a steering control device.

2. Description of Related Art

In related art, a steer-by-wire steering system in which a power transmission path between a steering unit that is steered by a driver and a turning unit that turns turning wheels according to steering performed by a driver is cut off is known as a kind of steering system. In such a kind of steering system, road surface information such as a road-surface reaction force applied to the turning wheels is not mechanically transmitted to a steering wheel. Therefore, a steering control device that controls such a kind of steering system performs control such that road surface information is conveyed to a driver by controlling a steering-side actuator provided in the steering unit such that a steering reaction force is applied to the steering wheel in consideration of the road surface information.

For example, a steering control device described in Japanese Unexamined Patent Application Publication No. 2019-127217 (JP 2019-127217 A) determines a steering reaction force in consideration of axial forces acting on a turning shaft provided in a turning unit and uses an obstacle-contact axial force for informing a driver of a situation in which turning wheels come into contact with an obstacle such as a curbstone, as one of the axial forces which are considered. In this case, when the turning wheels come into contact with an obstacle, the steering control device limits a driver's additional steering toward the obstacle by increasing the obstacle-contact axial force.

SUMMARY

The steering control device may consider various kinds of axial forces in addition to the obstacle-contact axial force as the axial forces used to determine the steering reaction force. In this regard, the axial force for informing a driver of a situation in which the turning wheels come into contact with an obstacle is set based on the situation in which the turning wheels come into contact with the obstacle. On the other hand, the other kinds of axial forces need to be set based on situations of the turning wheels which are different from the situation in which the turning wheels come into contact with the obstacle. Accordingly, since each of axial forces needs to be set based on the corresponding situation when the steering reaction force is determined in consideration of various kinds of axial forces, there is a concern that setting of axial forces considered to determine the steering reaction force will be complicated.

The disclosure provides a steering control device that can curb complication of setting of axial forces which are considered to determine a steering reaction force.

An aspect of the disclosure relates to a steering control device configured to control a steering system that has a structure in which a power transmission path between a steering unit that is connected to a steering wheel and a turning unit that turns turning wheels by an operation of a turning shaft according to steering input to the steering unit is cut off, the steering system having a function of changing a steering angle ratio which is a ratio of an amount of rotation of the turning wheels to an amount of rotation of the steering wheel. The steering control device includes a control unit configured to control at least an operation of a steering-side motor which is provided in the steering unit such that a steering reaction force which is a force against the steering input to the steering unit is generated. The control unit is configured to calculate a target reaction torque which is a target value of a motor torque of the steering-side motor, the motor torque serving as the steering reaction force; calculate a difference axial force that is used to limit steering for turning the turning wheels in a predetermined direction, the difference axial force being reflected in the target reaction torque; and set a reference angle to one of a steering angle which is set as a value indicating the amount of rotation of the steering wheel and a turning angle which is set as a value indicating the amount of rotation of the turning wheels, set a converted angle to an angle which is obtained by converting another of the steering angle and the turning angle according to the steering angle ratio, and calculate the difference axial force based on a difference between the reference angle and the converted angle.

With this configuration, the difference axial force is calculated based on the difference between the reference angle and the converted angle. In this case, in consideration of a change of the steering angle ratio, a configuration for converting one of the steering angle and the turning angle according to the steering angle ratio is employed in calculating the difference between the reference angle and the converted angle. Accordingly, when a relationship between the steering angle and the turning angle varies, the difference between the reference angle and the converted angle can be calculated as a deviation in which the steering angle ratio at that time is also reflected. When the difference axial force based on the difference between the reference angle and the converted angle is set, a plurality of kinds of axial forces can be considered together and thus the axial forces do not need to be individually set in the respective situations in which the axial forces need to be generated. Accordingly, it is possible to curb complication of setting of the axial forces which are considered to determine the steering reaction force.

In the steering control device, the control unit may be configured to calculate a difference axial component based on the difference between the reference angle and the converted angle; calculate a viscous axial component based on an angular velocity which is a rate of change of the reference angle or the converted angle, so as to adjust a change of the difference axial force; and acquire the difference axial force by reflecting the viscous axial component in the difference axial component.

With this configuration, for example, when the viscous axial component is calculated such that a change of the difference axial component decreases as the angular velocity increases, it is possible to curb a rapid change of the difference axial force. In this case, it is possible to more accurately convey a situation which occurs actually at the turning wheels to a driver while conveying the steering reaction force to the driver, for example, reproducing a sense of elasticity of the turning wheels when the turning wheels come into contact with an obstacle, a sense of viscosity when the turning wheels are turned, and a sense of stiffness of a mechanical configuration from the turning wheels to the steering wheel.

In the steering control device, a turning state quantity which is set as information indicating a difference between an ideal vehicle turning behavior and an actual vehicle turning behavior may be input to the control unit; and the control unit may be configured to calculate the difference between the reference angle and the converted angle using the turning angle for which compensation has been performed based on the turning state quantity.

The actual vehicle turning behavior may become different from the ideal vehicle turning behavior in the turning traveling state. With this configuration, it is possible to adjust the manner in which the situation is conveyed to a driver as the steering reaction force.

In the steering control device, the control unit may be configured to calculate a plurality of difference axial components including a first difference axial component which is acquired based on the difference between the reference angle and the converted angle, and a second difference axial component which is acquired based on the difference between the reference angle and the converted angle such that the second difference axial component has a different characteristic from a characteristic of the first difference axial component; and the control unit may be configured to reflect one of the first difference axial component and the second difference axial component in the difference axial force depending on whether an operation of a turning-side motor which is provided in the turning unit is to be limited or not.

With this configuration, the manner in which the magnitude of the difference between the reference angle and the converted angle appears may change due to the change of followability (responsiveness) of the turning angle according to whether the operation of a turning-side motor is to be limited or not to be limited. In this case, the difference axial component which is reflected in the difference axial force is switched between the first difference axial component and the second difference axial component according to whether the operation of the turning-side motor is to be limited or not to be limited. Accordingly, it is possible to calculate an appropriate difference axial force depending on whether the operation of a turning-side motor is to be limited or not to be limited.

In the steering control device, the control unit may be configured to have a function of gradually decreasing a difference between the first difference axial component and the second difference axial component before and after switching the difference axial component to be reflected in the difference axial force between the first difference axial component and the second difference axial component due to switching between a state in which the operation of the turning-side motor is not to be limited and a state in which the operation of the turning-side motor is to be limited.

With this configuration, when the difference axial component to be reflected in the difference axial force is switched between the first difference axial component and the second difference axial component due to switching between the state in which the operation of the turning-side motor is not to be limited and the state in which the operation of the turning-side motor is to be limited, it is possible to gradually decrease the difference between the first difference axial component and the second difference axial component even if there is the difference between the first difference axial component and the second difference axial component before and after the switching of the difference axial component to be reflected. Accordingly, it is possible to curb a rapid change of the difference axial force according to whether the operation of the turning-side motor is to be limited or not to be limited.

In the steering control device, the control unit may be configured to sum a plurality of difference axial components including a first difference axial component which is acquired based on the difference between the reference angle and the converted angle, and a second difference axial component which is acquired based on the difference between the reference angle and the converted angle such that the second difference axial component has a different characteristic from a characteristic of the first difference axial component, at predetermined distribution proportions; and the control unit may be configured to change the distribution proportions depending on whether an operation of a turning-side motor which is provided in the turning unit is to be limited or not to be limited, and to reflect the difference axial components which are summed at the distribution proportions in the difference axial force.

The manner in which the magnitude of the difference between the reference angle and the converted angle appears may change due to a change of followability (responsiveness) of the turning angle according to whether the operation of a turning-side motor is to be limited or not to be limited. In this case, the distribution proportions of the first difference axial component and the second difference axial component are changed according to whether the operation of the turning-side motor is to be limited or not to be limited. Accordingly, it is possible to calculate an appropriate difference axial force depending on whether the operation of the turning-side motor is to be limited or not to be limited.

In the steering control device, the control unit may be configured to have a function of gradually changing the distribution proportions at a time of changing the distribution proportions due to switching between a state in which the operation of the turning-side motor is not to be limited and a state in which the operation of the turning-side motor is to be limited.

With this configuration, when the distribution proportions are changed due to switching between the state in which the operation of the turning-side motor is not to be limited and the state in which the operation of the turning-side motor is to be limited, it is possible to gradually reflect the change. Accordingly, it is possible to curb a rapid change of the difference axial force according to whether the operation of the turning-side motor is to be limited or not to be limited.

In the steering control device, the control unit may be configured to set a gradient of the difference axial component with respect to the difference between the reference angle and the converted angle such that the gradient is larger when an absolute value of the difference between the reference angle and the converted angle is equal to or greater than a difference threshold value than when the absolute value of the difference between the reference angle and the converted angle is less than the difference threshold value; and the control unit may be configured to set an absolute value of the difference threshold value such that the absolute value of the difference threshold value is smaller when the operation of the turning-side motor is to be limited than when the operation of the turning-side motor is not to be limited.

In the situation in which the operation of the turning-side motor is to be limited, the difference between the reference angle and the converted angle may increase due to a decrease in the followability (responsiveness) of the turning angle. With this configuration, it is possible to curb an increase in this difference between the reference angle and the converted angle.

Here, in consideration of a situation in which steering of the steering wheel is limited at a steering limit of the steering wheel, that is, a turning limit of the turning wheels, the steering of the steering wheel cannot be limited using the difference axial force when the steering wheel is not actually steered beyond the steering limit to cause a difference between the reference angle and the converted angle in a situation in which the turning wheels cannot be turned.

Therefore, in the steering control device, the control unit may be configured to calculate an end axial force for limiting steering in a direction in which a steering angle limit is exceeded; and the control unit may be configured to have a function of separately calculating the difference axial force and the end axial force.

With this configuration, when the steering angle may exceed the steering angle limit, it is possible to limit steering in a direction in which the steering wheel is steered beyond the steering angle limit by setting the end axial force independently of the difference axial force. Accordingly, for example, when the steering wheel reaches the steering angle limit, it is possible to limit steering of the steering wheel even if there is no difference between the reference angle and the converted angle.

In the steering control device, the control unit may be configured to select an axial force having a largest absolute value out of a plurality of axial forces including the difference axial force and the end axial force; and the control unit may be configured to acquire the target reaction torque by reflecting the selected axial force in the target reaction torque.

With this configuration, there may be a situation in which a plurality of axial forces including the difference axial force and the end axial force are calculated together as values for generating a steering reaction force, and only one axial force having the largest absolute value is actually reflected in the target reaction torque even in that situation. Accordingly, even in the situation in which a plurality of axial forces including the difference axial force and the end axial force are calculated together as values for generating the steering reaction force, it is possible to curb an excessive increase of the steering reaction force.

In the steering control device, the control unit may be configured to perform reaction control such that the steering reaction force is generated by performing driving control for the steering-side motor and to perform turning control such that the turning wheels are turned by performing driving control for a turning-side motor which is provided in the turning unit; the control unit may be configured to perform control such that the steering angle ratio is changed based on a vehicle speed value which is set as information indicating a travel speed of a vehicle and to calculate a converted turning angle which is obtained by converting the turning angle to the steering angle according to the steering angle ratio; the reference angle may be the steering angle; and the converted angle may be the converted turning angle.

With this configuration, functions for performing conversion using the steering angle ratio can be integrated in the control unit. Thus, it is possible to realize a configuration for facilitating design of the control unit.

With the steering control device according to the aspect of the disclosure, it is possible to simplify setting of the steering reaction force.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
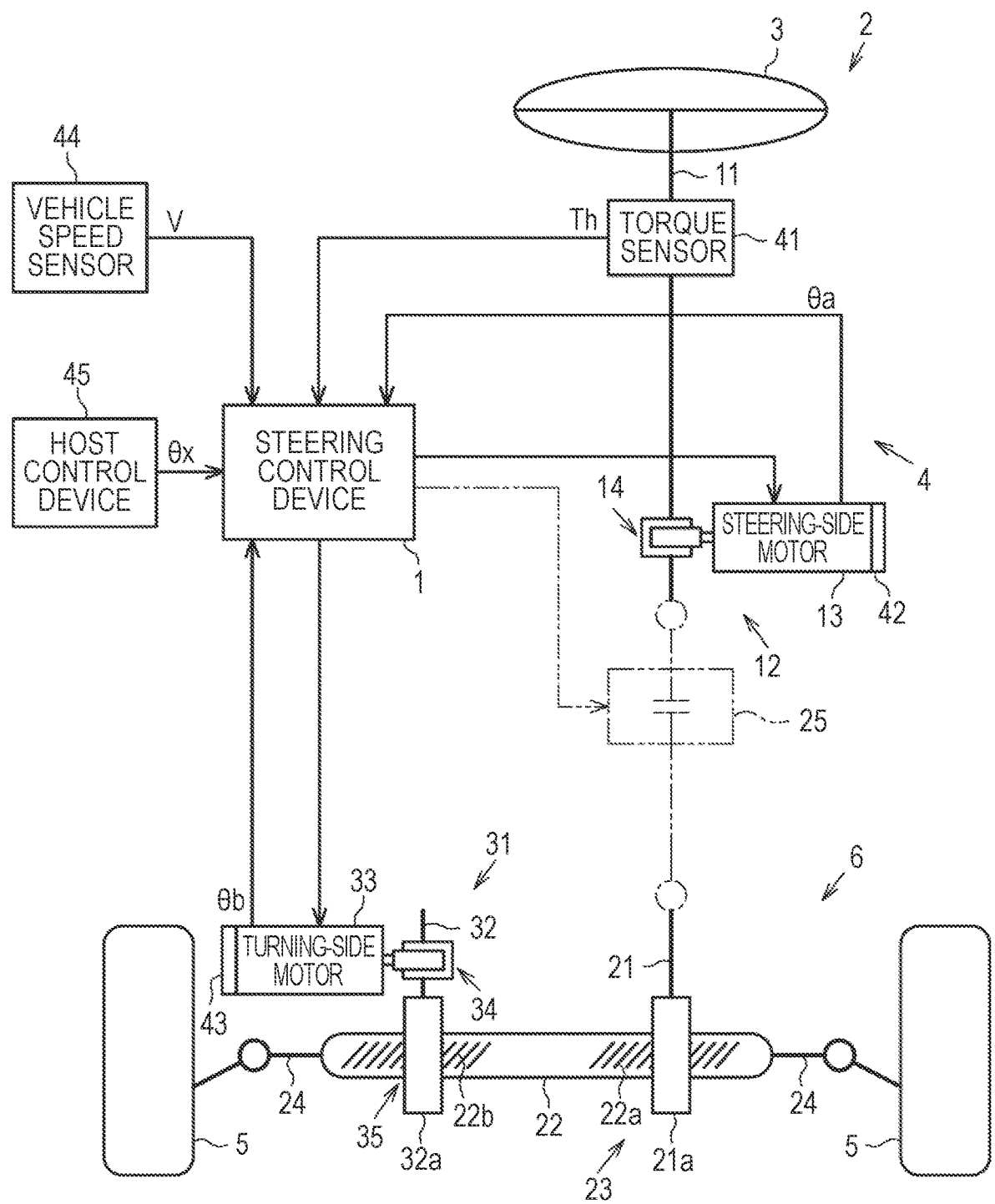
FIG. 1 is a diagram schematically illustrating a configuration of a steer-by-wire steering system according to a first embodiment.

Hereinafter, a steering control device according to a first embodiment will be described with reference to the accompanying drawings. As illustrated in FIG. 1, a steering system 2 of a vehicle which is controlled by a steering control device 1 is configured as a steer-by-wire steering system. The steering system 2 includes a steering unit 4 that is steered by a driver using a steering wheel 3 and a turning unit 6 that turns turning wheels 5 according to steering input to the steering unit 4 by a driver.

The steering unit 4 includes a steering shaft 11 to which the steering wheel 3 is fixed, and a steering actuator 12 that applies a steering reaction force which is a force against the driver's steering, to the steering wheel 3 via the steering shaft 11. The steering actuator 12 includes a steering-side motor 13 that serves as a drive source and a steering-side speed reduction mechanism 14 that reduces rotation of the steering-side motor 13 and transmits the reduced rotation to the steering shaft 11. For example, a three-phase brushless motor is employed as the steering-side motor 13 according to this embodiment.

The turning unit 6 includes a first pinion shaft 21 and a rack shaft 22 that is a turning shaft connected to the first pinion shaft 21. The first pinion shaft 21 and the rack shaft 22 are arranged with a predetermined crossing angle. A first rack and pinion mechanism 23 is configured by causing first pinion teeth 21*a* formed in the first pinion shaft 21 and first rack teeth 22*a* formed in the rack shaft 22 to engage with each other. Tie rods 24 are respectively connected to both ends of the rack shaft 22. The distal ends of the tie rods 24 are connected to knuckles (not illustrated) to which the right and left turning wheels 5 are assembled.

The turning unit 6 includes a turning actuator 31 that applies a turning force for turning the turning wheels 5 to the rack shaft 22. The turning actuator 31 applies a turning force to the rack shaft 22 via a second pinion shaft 32. The turning actuator 31 includes a turning-side motor 33 that serves as a drive source and a turning-side speed reduction mechanism 34 that reduces rotation of the turning-side motor 33 and transmits the reduced rotation to the second pinion shaft 32. The second pinion shaft 32 and the rack shaft 22 are arranged with a predetermined crossing angle. A second rack and pinion mechanism 35 is configured by causing second pinion teeth 32a formed in the second pinion shaft 32 and second rack teeth 22b formed in the rack shaft 22 to engage with each other.

In the steering system 2 having the aforementioned configuration, the second pinion shaft 32 is rotationally driven by the turning actuator 31 according to a driver's steering operation and this rotation is converted to a axial movement of the rack shaft 22 by the second rack and pinion mechanism 35, whereby the turning angle of the turning wheels 5 is changed. At this time, as a steering reaction force against the driver's steering, a force acting in a direction opposite to the driver's steering direction is applied to the steering wheel 3 from the steering actuator 12.

The reason why the first pinion shaft 21 is provided is that the rack shaft 22, along with the first pinion shaft 21, is supported in a housing which is not illustrated. That is, by a support mechanism (not illustrated) which is provided in the steering system 2, the rack shaft 22 is supported to be movable in an axial direction thereof and is pressed toward the first pinion shaft 21 and the second pinion shaft 32. Accordingly, the rack shaft 22 is supported in the housing. Another support mechanism that supports the rack shaft 22 in the housing may be provided instead of using the first pinion shaft 21.

An electrical configuration of the steering system 2 will be described below. The steering control device 1 is connected to the steering-side motor 13 and the turning-side motor 33. The steering control device 1 controls operations of the steering-side motor 13 and the turning-side motor 33. The steering control device 1 includes a central processing unit (CPU) and a memory which are not illustrated. The steering control device 1 performs various kinds of control by causing the CPU to execute a program stored in the memory at intervals of a predetermined calculation cycle.

A torque sensor 41 that detects a steering torque Th which is applied to the steering shaft 11 is connected to the steering control device 1. The torque sensor 41 is provided on the steering shaft 11 at a position closer to the steering wheel 3 than a connection part connected to the steering-side speed reduction mechanism 14 is. The torque sensor 41 detects the steering torque Th based on an amount of torsion of a torsion bar which is provided on an intermediate part of the steering shaft 11. A steering-side rotation angle sensor 42 and a turning-side rotation angle sensor 43 are connected to the steering control device 1.

The steering-side rotation angle sensor 42 detects a steering-side rotation angle $\theta a$ of the steering-side motor 13 as a relative angle in a range of 360°. The steering-side rotation angle $\theta a$ is used to calculate a steering angle $\theta s$. The steering-side motor 13 and the steering shaft 11 operate in conjunction with each other via the steering-side speed reduction mechanism 14. Accordingly, there is a correlation between the steering-side rotation angle $\theta a$ of the steering-side motor 13 and a rotation angle of the steering shaft 11 or a rotation angle of the steering wheel 3, that is, the steering angle $\theta s$ which is set as information indicating an amount of rotation. Accordingly, the steering angle $\theta s$ can be calculated based on the steering-side rotation angle $\theta a$ of the steering-side motor 13.

The turning-side rotation angle sensor 43 detects a turning-side rotation angle $\theta b$ of the turning-side motor 33 as a relative angle. The turning-side rotation angle $\theta b$ is used to calculate a pinion angle $\theta p$. The turning-side motor 33 and the second pinion shaft 32 operate in conjunction with each other via the turning-side speed reduction mechanism 34. Accordingly, there is a correlation between the turning-side rotation angle $\theta b$ of the turning-side motor 33 and the pinion angle $\theta p$ which is an actual rotation angle of the second pinion shaft 32. Accordingly, the pinion angle $\theta p$ can be calculated based on the turning-side rotation angle $\theta b$ of the turning-side motor 33. The second pinion shaft 32 engages with the rack shaft 22. Accordingly, the pinion angle $\theta p$ and an amount of movement of the rack shaft 22 have a correlation. That is, the pinion angle $\theta p$ is a value reflecting a turning angle of the turning wheels 5. The steering torque Th, the steering-side rotation angle $\theta a$, and the turning-side rotation angle $\theta b$ are calculated as positive values when steering to the right is performed and are calculated as negative values when steering to the left is performed.

A vehicle speed sensor 44 is connected to the steering control device 1. The vehicle speed sensor 44 detects a vehicle speed value V which is set as information indicating a travel speed of a vehicle. A host control device 45 is connected to the steering control device 1. The host control device 45 is a control device which is different from the steering control device 1 and is mounted in the vehicle in which the steering system 2 is mounted. The host control device 45 acquires an optimal control method based on a vehicle state at each time and individually instructs various onboard control devices to perform control based on the acquired control method. The host control device 45 according to this embodiment generates a drift state quantity $\theta x$ which is defined in an angle as a turning state quantity which is set as information indicating a difference between an ideal vehicle turning behavior and an actual vehicle turning behavior in a turning traveling state. For example, a yaw rate sensor is connected to the host control device 45, and the drift state quantity $\theta x$ is calculated as a value with a dimension of an angle (i.e., angular dimension) based on a difference between an actual yaw rate detected by the yaw rate sensor and an estimated yaw rate which is estimated and calculated as an ideal value based on the traveling state such as the vehicle speed value V during turning. The acquired drift state quantity $\theta x$ is output to the steering control device 1.

The steering control device 1 performs reaction control such that a steering reaction force based on the steering torque Th is generated by performing drive control for the steering-side motor 13. The steering control device 1 performs turning control such that the turning wheels 5 are turned according to a steering state by performing drive control for the turning-side motor 33.

Functions of the steering control device 1 will be described below. The steering control device 1 includes a central processing unit (CPU) and a memory which are not illustrated, and the CPU executes a program stored in the memory at intervals of a predetermined calculation cycle. Accordingly, various processes are performed.

Figure 2:
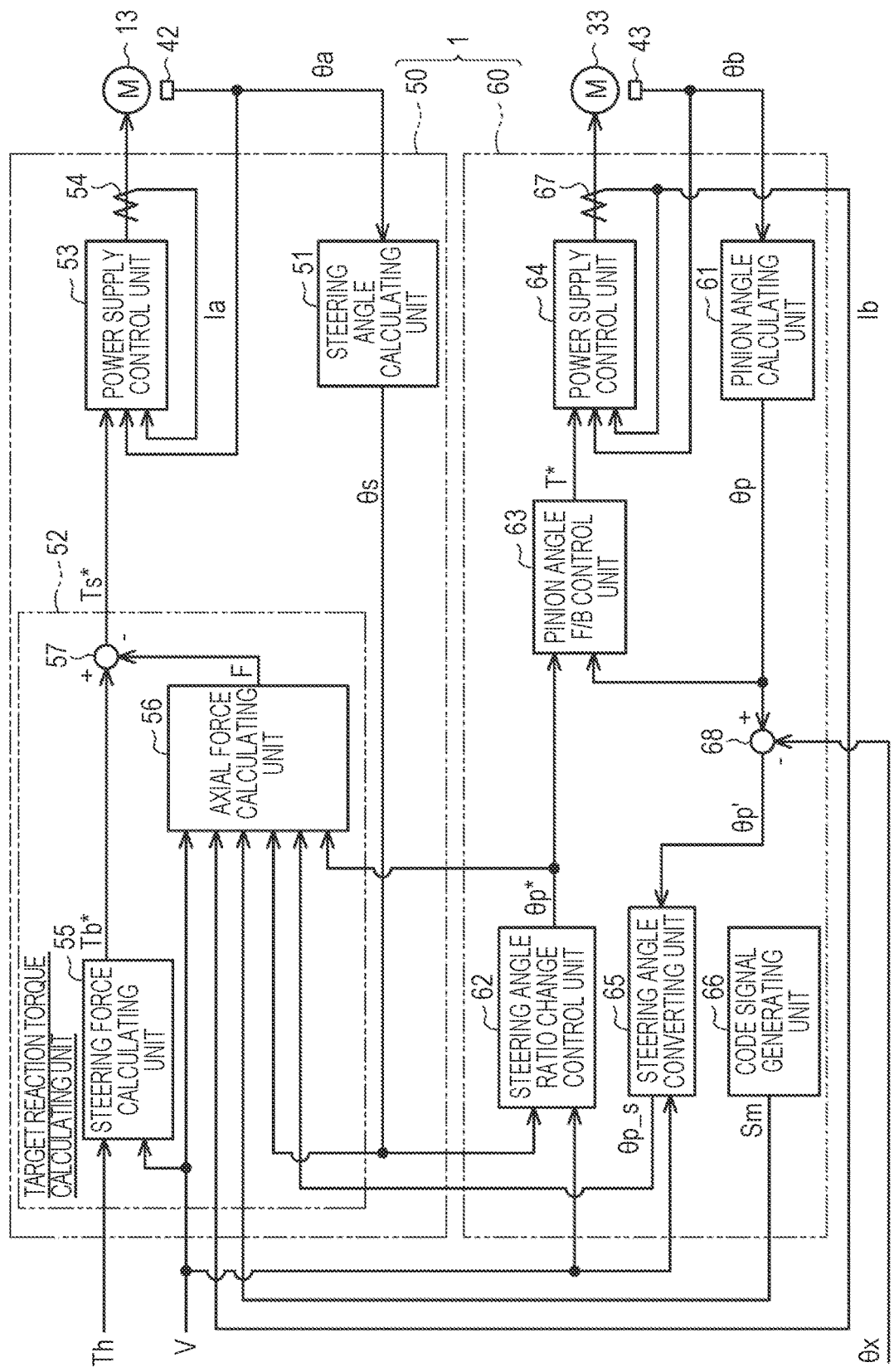
FIG. 2 is a block diagram illustrating functions of a steering control device according to the first embodiment.

Some processes which are performed by the steering control device 1 are illustrated in FIG. 2. The processes illustrated in FIG. 2 are some processes in each kind of processes which are realized by causing the CPU to execute a program stored in the memory.

As illustrated in FIG. 2, the steering control device 1 includes a steering-side control unit 50 that performs reaction control and a turning-side control unit 60 that performs turning control. The steering-side control unit 50 includes steering-side current sensors 54. The steering-side current sensors 54 are provided in connection lines between the steering-side control unit 50 and phase motor coils of the steering-side motor 13. The steering-side current sensors 54 detect a steering-side actual current value Ia which is acquired from values of phase currents of the steering-side motor 13, which flow in the corresponding connection lines.

The steering-side current sensors 54 acquire, as a current, a voltage drop of a shunt resistor connected on the source side of each switching element in an inverter (not illustrated) provided to correspond to the steering-side motor 13. In FIG. 2, for the purpose of convenience of description, the phase connection lines are collectively illustrated as one phase connection line, and the phase current sensors are collectively illustrated as one phase current sensor.

The turning-side control unit 60 includes turning-side current sensors 67. Turning-side current sensors 67 are provided in connection lines between the turning-side control unit 60 and phase motor coils of the turning-side motor 33. The turning-side current sensors 67 detect a turning-side actual current value Ib which is acquired from values of phase currents of the turning-side motor 33, which flow in the corresponding connection lines. The turning-side current sensors 67 acquire a voltage drop of a shunt resistor connected to the source side of each switching element in an inverter (not illustrated) provided to correspond to the turning-side motor 33 as a current. In FIG. 2, for the purpose of convenience of description, the phase connection lines are collectively illustrated as one phase connection line, and the phase current sensors are collectively illustrated as one phase current sensor.

Functions of the steering-side control unit 50 will be described below. The steering torque Th, the vehicle speed value V, the steering-side rotation angle θa, the turning-side actual current value Ib, a target pinion angle θp* which will be described later, a converted turning angle θp_s which will be described later, and a code signal Sm which will be described later are input to the steering-side control unit 50. The steering-side control unit 50 controls supply of electric power to the steering-side motor 13 based on the steering torque Th, the vehicle speed value V, the steering-side rotation angle θa, the turning-side actual current value Ib, the converted turning angle θp_s, and the code signal Sm. The converted turning angle θp_s is calculated based on the turning-side rotation angle θb.

The steering-side control unit 50 includes a steering angle calculating unit 51, a target reaction torque calculating unit 52, and a power supply control unit 53. The steering-side rotation angle θa is input to the steering angle calculating unit 51. The steering angle calculating unit 51 converts the steering-side rotation angle θa to a total angle including a range exceeding 360 degrees, for example, by counting the number of rotations of the steering-side motor 13 from a steering midpoint which is a position of the steering wheel 3 when the vehicle moves straight ahead. The steering angle calculating unit 51 calculates the steering angle θs by multiplying the total angle acquired by conversion, by a conversion factor based on a rotation speed ratio of the steering-side speed reduction mechanism 14. For example, the steering angle θs is calculated as a positive value when it is an angle on the right side of the steering midpoint and is calculated as a negative value when it is an angle on the left side of the steering midpoint.

The steering torque Th, the vehicle speed value V, the steering angle θs, the turning-side actual current value Ib, the target pinion angle θp* which will be described later, the converted turning angle θp_s which will be described later, and the code signal Sm which will be described later are input to the target reaction torque calculating unit 52. The target reaction torque calculating unit 52 calculates a target reaction torque Ts* which is a target reaction control value of the steering reaction force of the steering wheel 3 which is to be generated by the steering-side motor 13, based on the steering torque Th, the vehicle speed value V, the steering angle θs, the turning-side actual current value Ib, the target pinion angle θp*, the converted turning angle θp_s, and the code signal Sm.

Specifically, the target reaction torque calculating unit 52 includes a steering force calculating unit 55 and an axial force calculating unit 56. The steering torque Th and the vehicle speed value V are input to the steering force calculating unit 55. The steering force calculating unit 55 calculates a steering force Tb* based on the steering torque Th and the vehicle speed value V. The steering force Tb* acts in the same direction as a driver's steering direction. The steering force calculating unit 55 calculates the steering force Tb* such that the absolute value thereof increases as the absolute value of the steering torque Th increases and as the vehicle speed value V decreases. The steering force Tb* is calculated as a value with the dimension of a torque (N·m). The acquired steering force Tb* is output to a subtractor 57.

The vehicle speed value V, the steering angle θs, the turning-side actual current value Ib, the target pinion angle θp* which will be described later, the converted turning angle θp_s which will be described later, and the code signal Sm which will be described later are input to the axial force calculating unit 56. The axial force calculating unit 56 calculates an axial force F applied to the rack shaft 22 via the turning wheels 5 based on the vehicle speed value V, the steering angle θs, the turning-side actual current value Ib, the target pinion angle θp* which will be described later, the converted turning angle θp_s which will be described later, and the code signal Sm which will be described later. The axial force F is calculated as a value with the dimension of a torque (N·m). The axial force F acts in a direction opposite to a driver's steering direction. The subtractor 57 calculates a target reaction torque Ts* by subtracting the axial force F from the steering force Tb*. The acquired target reaction torque Ts* is output to the power supply control unit 53.

The target reaction torque Ts*, the steering-side rotation angle θa, and the steering-side actual current value Ia are input to the power supply control unit 53. The power supply control unit 53 calculates a current command value Ia* for the steering-side motor 13 based on the target reaction torque Ts*. The power supply control unit 53 calculates a difference between the current command value Ia* and a current value on a d-q coordinate system acquired by converting the steering-side actual current value Ia based on the steering-side rotation angle θa, and controls supply of electric power to the steering-side motor 13 such that the difference is cancelled out. The steering-side motor 13 generates a torque corresponding to the target reaction torque Ts*. Accordingly, it is possible to give an appropriate feeling of response to a driver.

Functions of the turning-side control unit 60 will be described below. The turning-side control unit 60 includes a pinion angle calculating unit 61, a steering angle ratio change control unit 62, a pinion angle feedback control unit ("pinion angle FB control unit" in FIG. 2) 63, a power supply control unit 64, a steering angle converting unit 65, and a code signal generating unit 66.

The turning-side rotation angle θb is input to the pinion angle calculating unit 61. The pinion angle calculating unit 61 converts the turning-side rotation angle θb to a total angle including a range exceeding 360 degrees, for example, by counting the number of rotations of the turning-side motor 33 from a rack midpoint which is a position of the rack shaft 22 when the vehicle travels straight. The pinion angle calculating unit 61 calculates the pinion angle θp which is an actual rotation angle of the second pinion shaft 32 by multiplying the total angle acquired by conversion, by a conversion factor based on a rotation speed ratio of the turning-side speed reduction mechanism 34. For example, the pinion angle θp is calculated as a positive value when the angle is an angle on the right side of the rack midpoint and is calculated as a negative value when the angle is an angle on the left side of the rack midpoint. The acquired pinion angle θp is output to the pinion angle feedback control unit 63. The subtractor 68 calculates a post-compensation pinion angle θp' by subtracting the drift state quantity θx from the pinion angle θp. The acquired post-compensation pinion angle θp' is output to the steering angle converting unit 65.

The vehicle speed value V and the steering angle θs are input to the steering angle ratio change control unit 62. The steering angle ratio change control unit 62 calculates the target pinion angle θp* by adding an amount of adjustment to the steering angle θs. The steering angle ratio change control unit 62 changes an amount of adjustment for changing the steering angle ratio which is a ratio of the target pinion angle θp* to the steering angle θs, according to the vehicle speed value V. For example, the amount of adjustment is changed such that a change of the target pinion angle θp* with respect to the change of the steering angle θs is larger when the vehicle speed value V is low than that when the vehicle speed value V is high. There is a correlation between the steering angle θs and the target pinion angle θp*. The pinion angle θp is controlled based on the target pinion angle θp*. Accordingly, there is also a correlation between the steering angle θs and the pinion angle θp.

The target pinion angle θp* and the pinion angle θp are input to the pinion angle feedback control unit 63. The pinion angle feedback control unit 63 performs PD control using a proportional term and a differential term as feedback control for the pinion angle θp such that the pinion angle θp conforms to the target pinion angle θp*. That is, the pinion angle feedback control unit 63 calculates a difference between the target pinion angle θp* and the pinion angle θp and calculates a steering force command value T* which is a target control value for the steering force such that the difference is cancelled out.

The steering force command value T*, the turning-side rotation angle θb, and the turning-side actual current value Ib are input to the power supply control unit 64. The power supply control unit 64 calculates a current command value Ib* for the turning-side motor 33 based on the steering force command value T*. The power supply control unit 64 calculates a difference between the current command value Ib* and a current value on the d-q coordinate system acquired by converting the turning-side actual current value Ib based on the turning-side rotation angle θb, and controls supply of electric power to the turning-side motor 33 such that the difference is cancelled out. Accordingly, the turning-side motor 33 rotates by an angle corresponding to the turning-side command value T*.

The vehicle speed value V and the post-compensation pinion angle θp' are input to the steering angle converting unit 65. The steering angle converting unit 65 calculates the converted turning angle θp_s by adding an amount of adjustment Δθ' to the post-compensation pinion angle θp'. The steering angle converting unit 65 changes the amount of adjustment Δθ' according to the vehicle speed value V such that a calculation rule in which a relationship between an input and an output of the calculation rule defined by the steering angle ratio change control unit 62 is inverted is obtained. That is, when the steering angle ratio change control unit 62 sets the change of the target pinion angle θp* with respect to the change of the steering angle θs to be larger when the vehicle speed value V is low than when the vehicle speed value V is high, the steering angle converting unit 65 changes the amount of adjustment Δθ' such that the change of the converted turning angle θp_s with respect to the change of the post-compensation pinion angle θp' is smaller when the vehicle speed value V is low than when the vehicle speed value V is high. Accordingly, the steering angle converting unit 65 calculates the converted turning angle θp_s by converting the post-compensation pinion angle θp' represented as a value of an index of the turning angle to a value of an index of the steering angle according to the steering angle ratio. One example of the converted angle in the disclosure is the converted turning angle θp_s. The acquired converted turning angle θp_s is output to the axial force calculating unit 56.

A result of detection from a temperature sensor (not illustrated) and the like is input to the code signal generating unit 66. For example, the temperature sensor detects a temperature of a motor coil of the turning-side motor 33 or an inverter. In this case, the code signal generating unit 66 determines a heated state as a state of the turning-side motor 33 by comparing the temperature detected by the temperature sensor with a plurality of temperature threshold values. The heated state of the turning-side motor 33 includes, for example, a normally heated state, a slightly overheated state, an intermediately overheated state, and a severely overheated state sequentially from a side on which the necessity for limiting the operation of the turning-side motor 33 is the lowest. The normally heated state indicates that the operation of the turning-side motor 33 is not limited. On the other hand, the slightly overheated state, the intermediately overheated state, and the severely overheated state indicate that the operation of the turning-side motor 33 is limited.

A result of detection from a voltage sensor (not illustrated) and the like is input to the code signal generating unit 66. For example, the voltage sensor detects a voltage of a DC power supply such as the battery. In this case, the code signal generating unit 66 determines a voltage state of the DC power supply by comparing the voltage detected by the voltage sensor with a plurality of voltage threshold values. The voltage state of the DC power supply includes, for example, a normal voltage state, a slightly voltage-dropped state, an intermediately voltage-dropped state, and a severely voltage-dropped state sequentially from a side on which the necessity for limiting the operation of the turning-side motor 33 is the lowest. The normal voltage state indicates that the operation of the turning-side motor 33 is not limited. On the other hand, the slightly voltage-dropped state, the intermediately voltage-dropped state, and the severely voltage dropped state indicate that the operation of the turning-side motor 33 is limited.

The code signal generating unit 66 performs the following process at the time of generating the code signal Sm. That is, the code signal generating unit 66 codes the state of the steering system 2 according to a code table which is stored in the storage unit of the steering control device 1. The coding is a process of expressing the state of the steering system 2 as a code which is a sign. The state of the steering system 2 includes the heated state of the turning-side motor 33 and the voltage state of the DC power supply. An example of a correspondence between the state of the steering system 2 and the code is as follows.

Code "0" indicates a normal state in which the operation of the turning-side motor 33 is not limited. Code "1A" indicates the slightly overheated state of the turning-side motor 33. Code "1B" indicates the intermediately overheated state of the turning-side motor 33. Code "1C" indicates the severely overheated state of the turning-side motor 33. Code "2A" indicates the slightly voltage-dropped state of the DC power supply. Code "2B" indicates the intermediately voltage-dropped state of the DC power supply. Code "2C" indicates the severely voltage-dropped state of the DC power supply. The code signal generating unit 66 generates the code signal Sm representing the code corresponding to the state of the steering system 2. The acquired code signal Sm is output to the axial force calculating unit 56.

In this embodiment, the steering-side control unit 50 can determine the state of the steering system 2, particularly the state of the turning-side motor 33, when the turning-side control unit 60 outputs the code signal Sm which is a signal representing the state of the steering system 2 to the steering-side control unit 50. The steering-side control unit 50 can determine the state of the turning-side motor 33 even in a configuration in which the turning-side control unit 60 outputs various kinds of information such as the temperature of the turning-side motor 33 and the voltage of the DC power supply to the steering-side control unit 50. In this regard, this embodiment is more advantageous in that it is possible to decrease an amount of information to be output and to decrease a communication load between the steering-side control unit 50 and the turning-side control unit 60 in comparison with the case in which the turning-side control unit 60 outputs various kinds of information such as the temperature of the turning-side motor 33 and the voltage of the DC power supply to the steering-side control unit 50.

The temperature threshold value is set to, for example, a value in a range which is experimentally acquired as a temperature at which the state of the motor coil or the inverter is considered to approach an overheated state. The voltage threshold value is set to, for example, a value in a range which is experimentally acquired as a voltage at which the state of the motor coil or the inverter is considered to approach a state in which the DC power supply cannot sufficiently supply electric power. The turning-side control unit 60 performs control in a protection mode in which supply of electric power to the turning-side motor 33 is limited such that the operation of the turning-side motor 33 can be limited, in states other than the normally heated state and the normally voltage-dropped state. On the other hand, the turning-side control unit 60 performs control in a normal mode in which the operation of the turning-side motor 33 is not limited and supply of electric power to the turning-side motor 33 is not limited in the normally heated state and the normally voltage-dropped state.

Figure 3:
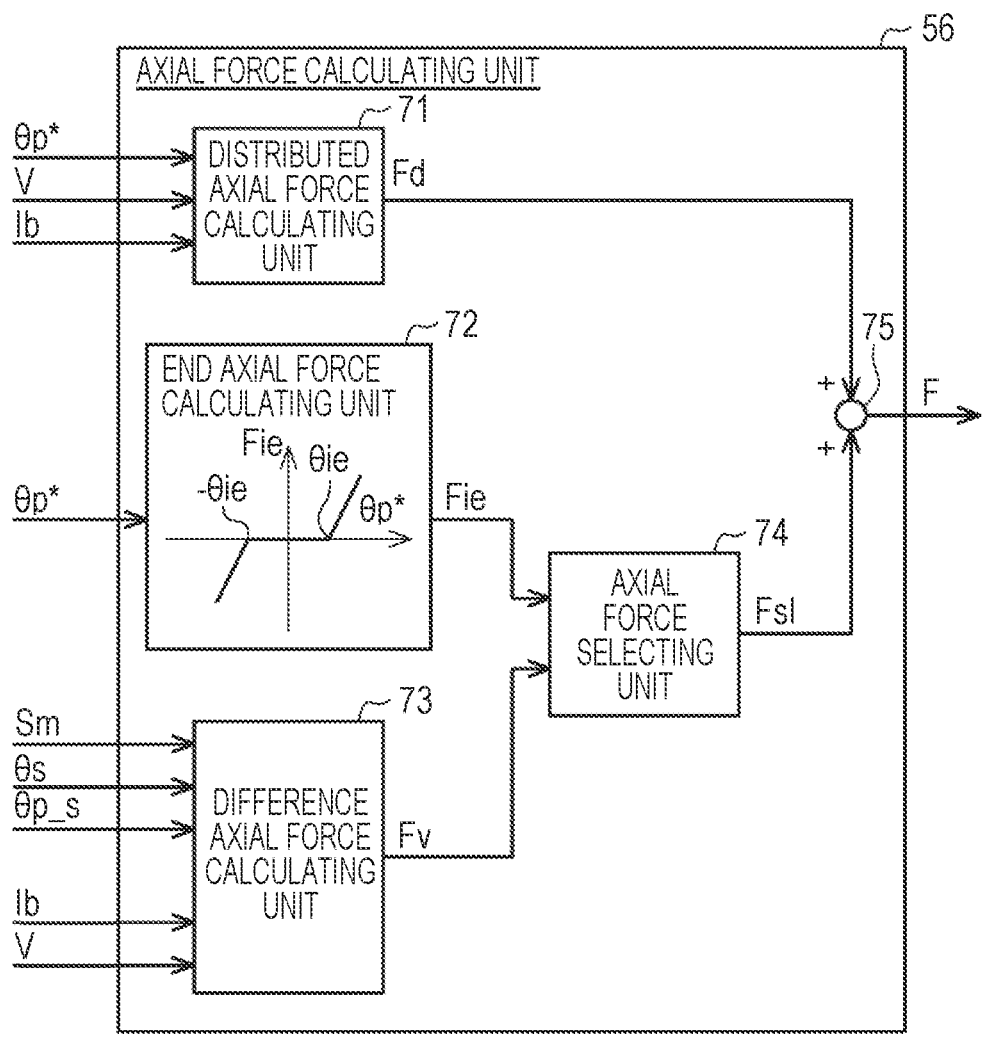
FIG. 3 is a block diagram illustrating functions of an axial force calculating unit according to the first embodiment.

The functions of the axial force calculating unit 56 will be described below in more detail. As illustrated in FIG. 3, the axial force calculating unit 56 includes a distributed axial force calculating unit 71, an end axial force calculating unit 72, a difference axial force calculating unit 73, and an axial force selecting unit 74.

The distributed axial force calculating unit 71 calculates a distributed axial force Fd based on an axial force acting on the rack shaft 22. The distributed axial force Fd corresponds to a calculational axial force which is obtained by estimating the axial force acting on the rack shaft 22 by distributing an angle axial force Fr and a current axial force Fi which will be described later at distribution proportions thereof such that the axial force acting on the rack shaft 22 via the turning wheels 5 is appropriately reflected. The acquired distributed axial force Fd is output to an adder 75.

The end axial force calculating unit 72 calculates an end axial force Fie for conveying, to a driver, a situation in which a steering limit of the steering wheel 3, that is, a turning limit of the turning wheels 5 has been reached. The end axial force Fie corresponds to a force against steering of the steering wheel 3 such that additional steering to a side exceeding a steering angle limit corresponding to the steering limit is limited when the absolute value of the steering angle θs approaches the steering angle limit. The acquired end axial force Fie is output to the axial force selecting unit 74.

The difference axial force calculating unit 73 calculates a difference axial force Fv for conveying, to a driver, a situation in which a relationship between the steering state of the steering wheel 3 and the turning state of the turning wheels 5 according to the steering angle ratio changes. An Example of the case in which a relationship between the steering state of the steering wheel 3 and the turning state of the turning wheels 5 according to the steering angle ratio changes is as follows. The example is a situation in which the turning wheels 5 come into contact with an obstacle such as a curbstone and the turning wheels 5 cannot be turned toward one side where the obstacle is located but the steering wheel 3 is steered toward the one side beyond a stop position of the steering wheel 3 corresponding to a stop position of the turning wheels 5 because a power transmission path between the steering unit 4 and the turning unit 6 is cut off. Another example thereof is a situation in which the operation of the turning-side motor 33 is limited for protection from overheating, thus the pinion angle θp is less likely to conform to (i.e., less likely to follow) the target pinion angle θp*, and thus the correlation between the steering angle θs and the turning angle collapses. The difference axial force Fv corresponds to a force against steering of the steering wheel 3 such that additional steering of the steering wheel 3 is limited when the turning wheels 5 come into contact with an obstacle such as a curbstone. The difference axial force Fv corresponds to a force against steering of the steering wheel such that the steering of the steering wheel 3 is limited to secure followability (responsiveness) of the pinion angle θp with respect to the target pinion angle θp* when the operation of the turning-side motor 33 is limited for protection from overheating. The acquired difference axial force Fv is output to the axial force selecting unit 74.

The end axial force Fie and the difference axial force Fv are input to the axial force selecting unit 74. The axial force selecting unit 74 selects an axial force having the largest absolute value out of the end axial force Fie and the difference axial force Fv, and calculates the selected axial force as a selected axial force Fsl. The adder 75 calculates the axial force F by adding the selected axial force Fsl to the distributed axial force Fd. The acquired axial force F is output to the subtractor 57. The subtractor 57 calculates the target reaction torque Ts* by subtracting the distributed axial force Fd from the steering force Tb*. The acquired target reaction torque Ts* is output to the power supply control unit 53.

Figure 4:
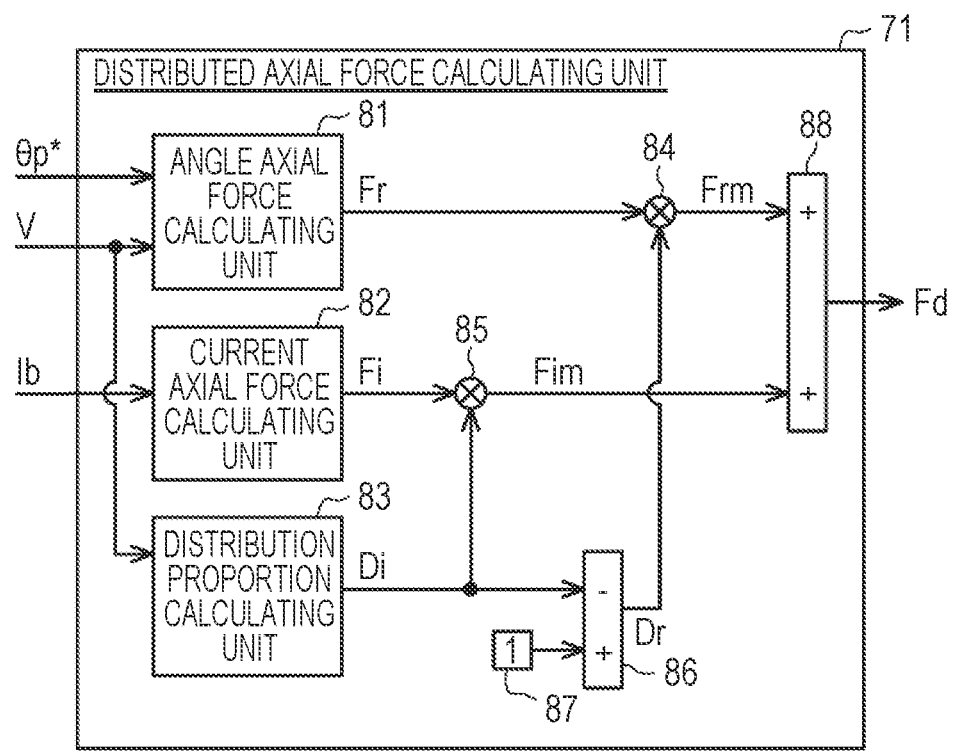
FIG. 4 is a block diagram illustrating functions of a distributed axial force calculating unit according to the first embodiment.

The function of the distributed axial force calculating unit 71 will be described below in more detail. As illustrated in FIG. 4, the distributed axial force calculating unit 71 includes an angle axial force calculating unit 81, a current axial force calculating unit 82, and a distribution proportion calculating unit 83.

The target pinion angle θp* and the vehicle speed value V are input to the angle axial force calculating unit 81. The angle axial force calculating unit 81 calculates an angle axial force Fr based on the target pinion angle θp* and the vehicle speed value V. The angle axial force Fr is an ideal value of an axial force which is defined by a model for a vehicle which is arbitrarily set. The angle axial force Fr is calculated as an axial force in which road surface information is not reflected. Road surface information is information such as fine unevenness that does not affect a behavior in the lateral direction of the vehicle or a stepped portion affecting the behavior in the lateral direction of the vehicle. Specifically, the angle axial force calculating unit 81 calculates the angle axial force Fr such that the absolute value thereof increases as the absolute value of the target pinion angle θp* increases. The angle axial force calculating unit 81 calculates the angle axial force Fr such that the absolute value thereof increases as the vehicle speed value V increases. The angle axial force Fr is calculated as a value with the dimension of a torque (N·m). The acquired angle axial force Fr is output to a multiplier 84.

The turning-side actual current value Ib is input to the current axial force calculating unit 82. The current axial force calculating unit 82 calculates the current axial force Fi based on the turning-side actual current value Ib. The current axial force Fi is an estimated value of the axial force actually acting on the rack shaft 22 that operates to turn the turning wheels 5, that is, an axial force which is actually conveyed to the rack shaft 22. The current axial force Fi is calculated as an axial force in which the road surface information is reflected. Specifically, the current axial force calculating unit 82 calculates the current axial force Fi based on the assumption that a torque applied to the rack shaft 22 by the turning-side motor 33 and a torque corresponding to a force applied to the rack shaft 22 via the turning wheels 5 are balanced such that the absolute value of the current axial force Fi increases as the absolute value of the turning-side actual current value Ib increases. The current axial force Fi is calculated as a value with the dimension of a torque (N·m). The calculated current axial force Fi is output to a multiplier 85.

The vehicle speed value V is input to the distribution proportion calculating unit 83. The distribution proportion calculating unit 83 calculates a distribution gain Di based on the vehicle speed value V. The distribution gain Di is a distribution proportion of the current axial force Fi when the angle axial force Fr and the current axial force Fi are distributed to acquire the axial force F. Specifically, the distribution proportion calculating unit 83 includes a distribution gain map in which a relationship between the vehicle speed value V and the distribution gain Di is defined, and calculates the distribution gain Di using the map and using the vehicle speed value V as an input.

The distribution gain Di is "1 (100%)" when the vehicle speed value V represents a low vehicle speed including a stopped state. In this case, at the low vehicle speed, this represents that only the current axial force Fi is distributed to the axial force F, that is, the angle axial force Fr is not distributed. The distribution gain Di is "zero (0%)" when the vehicle speed value V represents a high vehicle speed such as 60 km/h or higher. In this case, at the high vehicle speed, this represents that only the angle axial force Fr is distributed to the axial force F, that is, the current axial force Fi is not distributed. That is, the distribution proportion in this embodiment includes a concept of a zero value at which only one of the angle axial force Fr and the current axial force Fi is distributed to the axial force F.

The current axial force Fi acquired by the current axial force calculating unit 82 is multiplied by the acquired distribution gain Di, and is output as a final current axial force Fim acquired by the multiplier 85, to the adder 88. The subtractor 86 calculates a distribution gain Dr by subtracting the distribution gain Di from "1" stored in a storage unit 87. The acquired distribution gain Dr is output to the multiplier 84. The distribution gain Dr is a distribution proportion of the angle axial force Fr when the angle axial force Fr and the current axial force Fi are distributed to acquire the axial force F. That is, the distribution gain Dr is calculated such that a sum of the distribution gain Dr and the distribution gain Di is "1 (100%)." The storage unit 87 is a predetermined storage area of a memory which is not illustrated.

The angle axial force Fr acquired by the angle axial force calculating unit 81 is multiplied by the acquired distribution gain Dr, and is output as a final angle axial force Frm acquired by the multiplier 84, to the adder 88. The acquired final angle axial force Frm is added to the current axial force Fim and is output as a distributed axial force Fd acquired by the adder 88, to the adder 75.

The function of the end axial force calculating unit 72 will be described below in detail. As illustrated in FIG. 3, the target pinion angle θp* is input to the end axial force calculating unit 72. The end axial force calculating unit 72 calculates an end axial force Fie based on the target pinion angle θp*. Specifically, the end axial force calculating unit 72 includes an end axial force map in which a relationship between the target pinion angle θp* and the end axial force Fie is defined, and calculates the end axial force Fie using the map and using the target pinion angle θp* as an input. When the absolute value of the target pinion angle θp* is equal to or less than a threshold angle θie, the end axial force calculating unit 72 calculates the end axial force Fie as "0." When the absolute value of the target pinion angle θp* is greater than the threshold angle θie, the end axial force calculating unit 72 calculates the end axial force Fie such that the absolute value thereof is greater than "0." The end axial force Fie is set such that the absolute value thereof becomes large enough to make it impossible to perform further steering of the steering wheel 3 with a human hand when the absolute value of the target pinion angle θp* becomes larger than the threshold angle θie and becomes large to a certain extent. The acquired end axial force Fie is output to the axial force selecting unit 74.

Figure 5:
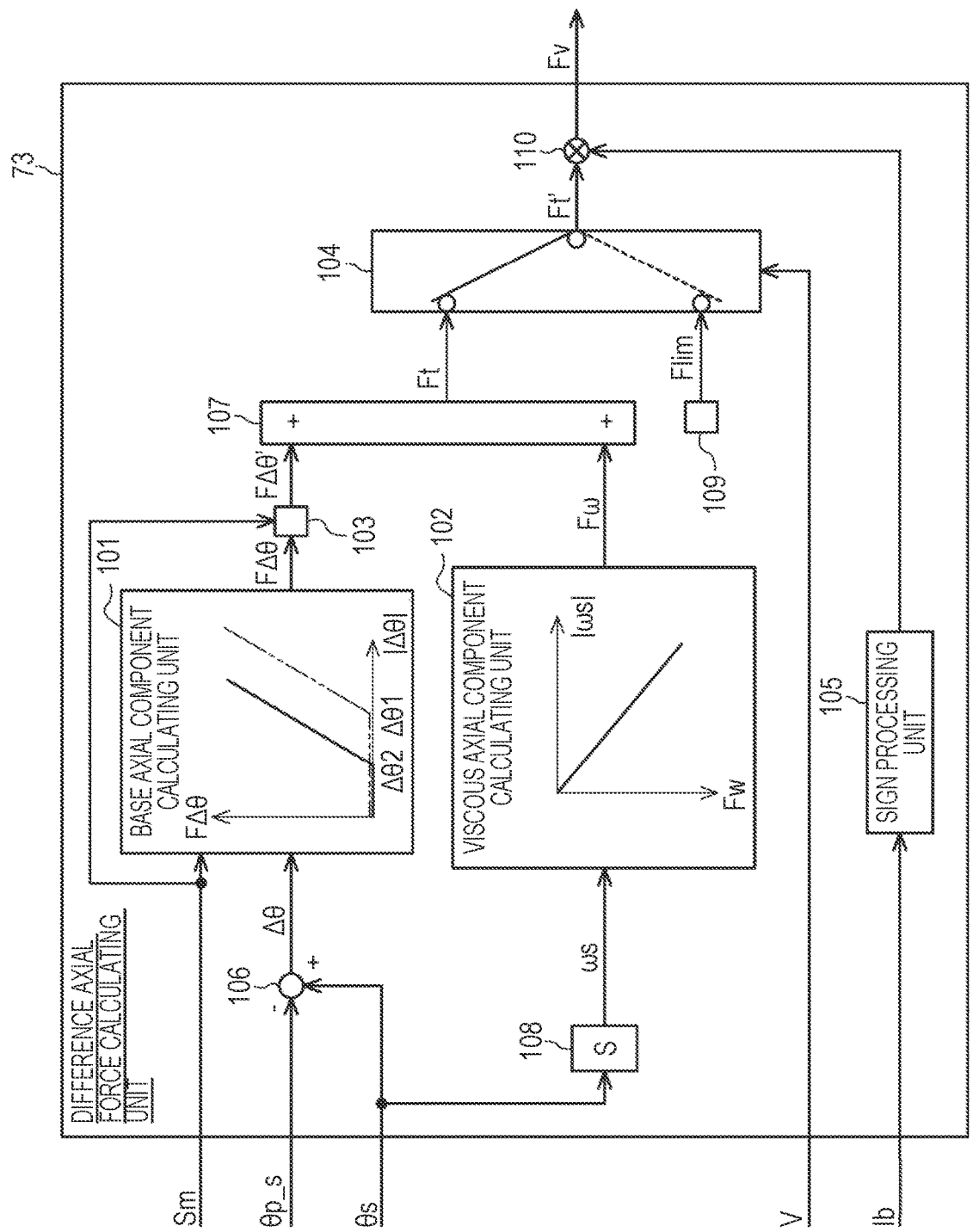
FIG. 5 is a block diagram illustrating functions of a difference axial force calculating unit according to the first embodiment.

The function of the difference axial force calculating unit 73 will be described below in detail. As illustrated in FIG. 5, the difference axial force calculating unit 73 includes a base axial component calculating unit 101, a viscous axial component calculating unit 102, a gradual change processing unit 103, an upper limit guard processing unit 104, and a sign processing unit 105.

The difference Δθ which is acquired by the subtractor 106 by subtracting the converted turning angle θp_s from the steering angle θs, and the code signal Sm are input to the base axial component calculating unit 101. The base axial component calculating unit 101 calculates a base axial component FΔθ based on the difference Δθ and the code signal Sm. Specifically, the base axial component calculating unit 101 includes a base axial component map in which a relationship between the absolute value of the difference Δθ and the base axial component FΔθ is defined, and calculates the base axial component FΔθ using the map and using the difference Δθ as an input. One example of the reference angle in the disclosure is the steering angle θs.

In this embodiment, the base axial component calculating unit 101 includes two kinds of maps as the base axial component maps. The base axial component calculating unit 101 calculates the base axial component FΔθ using one of the two kinds of maps based on the code signal Sm. When the code signal Sm indicating the code "0" of the normal state in which the operation of the turning-side motor 33 is not limited, that is, a normal mode is performed, is input, the base axial component calculating unit 101 performs map calculation using the base axial component map for the normal mode indicated by an alternate long and two short dashes line in FIG. 5. In FIG. 5, the base axial component map for the normal mode indicated by the alternate long and two short dashes line is set such that a gradient of the base axial component $F\Delta\theta$ with respect to the difference $\Delta\theta$ is larger when the absolute value of the difference $\Delta\theta$ is equal to or greater than a first difference threshold value $\Delta\theta1$ than when the absolute value of the difference $\Delta\theta$ is less than the first difference threshold value $\Delta\theta1$. That is, in the case where the code signal Sm indicating that the normal mode is to be performed is input, the base axial component calculating unit 101 calculates the base axial component $F\Delta\theta$ as "0" when the absolute value of the difference $\Delta\theta$ is less than the first difference threshold value $\Delta\theta1$, and calculates the base axial component $F\Delta\theta$ such that the absolute value thereof is greater than "0" when the absolute value of the difference $\Delta\theta$ is equal to or greater than the first difference threshold value $\Delta\theta1$. The base axial component $F\Delta\theta$ acquired using the base axial component map for the normal mode corresponds to the first difference axial component.

In the case where the code signal Sm indicating a code other than the code "0" for the normal state, i.e., a code for a state in which the operation of the turning-side motor 33 is limited, that is, a code indicating a protection mode is to be performed, is input, the base axial component calculating unit 101 performs map calculation using the base axial component map for the protection mode indicated by a solid line in FIG. 5. In FIG. 5, the base axial component map for the protection mode indicated by the solid line is set such that the gradient of the base axial component $F\Delta\theta$ with respect to the difference $\Delta\theta$ is larger when the absolute value of the difference $\Delta\theta$ is equal to or greater than a second difference threshold value $\Delta\theta2$ than when the absolute value of the difference $\Delta\theta$ is less than the second difference threshold value $\Delta\theta2$. That is, when the code signal Sm indicating that the protection mode is to be performed is input, the base axial component calculating unit 101 calculates the base axial component $F\Delta\theta$ as "0" when the absolute value of the difference $\Delta\theta$ is less than the second difference threshold value $\Delta\theta2$, and calculates the base axial component $F\Delta\theta$ such that the absolute value thereof is greater than "0" when the absolute value of the difference $\Delta\theta$ is equal to or greater than the second difference threshold value $\Delta\theta2$. The base axial component $F\Delta\theta$ acquired using the base axial component map for the protection mode corresponds to the second difference axial component. The acquired base axial component $F\Delta\theta$ is output to the gradual change processing unit 103.

In this embodiment, the second difference threshold value $\Delta\theta2$ is set to a value less than the first difference threshold value $\Delta\theta1$. That is, the base axial component map which is used for map calculation in a situation in which the normal mode is performed has a shape obtained by moving, in parallel, the map used for map calculation in the situation in which the protection mode is performed in a direction in which the difference $\Delta\theta$ increases. Accordingly, in the base axial component map which is used for map calculation in the situation in which the normal mode is performed, a dead band of the difference $\Delta\theta$ is set to be greater than that in the base axial component map which is used for map calculation in the situation in which the protection mode is performed. That is, in the situation in which the normal mode is performed, the state in which the gradient of the base axial component $F\Delta\theta$ with respect to the difference $\Delta\theta$ increases occurs at a larger value of the difference $\Delta\theta$ in comparison with the situation in which the protection mode is performed. This is because a driver's steering operation may be hindered in the normal mode if the difference axial force Fv is calculated based on the small difference $\Delta\theta$.

Particularly, in this embodiment, since the pinion angle feedback control unit 63 employs PD control in which there is no integral term, there is a likelihood that a small difference will remain between the target pinion angle $\theta p*$ and the pinion angle $\theta p$ in comparison with PID control. When a small difference remains between the target pinion angle $\theta p*$ and the pinion angle $\theta p$, there is a likelihood that a small difference $\Delta\theta$ will occur therefor. Accordingly, if a dead band is set to the same size in both the protection mode and the normal mode, the difference axial force Fv may be frequently generated in a state in which the difference $\Delta\theta$ is small in the normal mode. As a result, a driver's steering operation may be hindered in the normal mode. However, in this embodiment, by setting the dead band in the normal mode to be greater than the dead band in the protection mode, it is possible to decrease the frequency with which the difference axial force Fv is generated even in the normal mode when the difference $\Delta\theta$ is small, and it is possible to reduce occurrence of the situation in which the driver's steering operation is hindered by the difference axial force Fv in the normal mode.

The base axial component $F\Delta\theta$ and the code signal Sm are input to the gradual change processing unit 103. When the content of the code signal Sm switches between the code "0" and the code other than "0," that is, between the normal mode and the protection mode, the gradual change processing unit 103 performs a temporal gradual change process on the base axial component $F\Delta\theta$. Specifically, when the mode is switched between the normal mode and the protection mode, the gradual change processing unit 103 acquires a difference of the post-switching base axial component $F\Delta\theta$ from the base axial component $F\Delta\theta$ calculated before the switching and calculates the difference, as an offset value. In this case, the gradual change processing unit 103 calculates a processed base axial component $F\Delta\theta'$ by shifting the post-switching base axial component $F\Delta\theta$ toward the pre-switching base axial component $F\Delta\theta$ by the offset value. The gradual change processing unit 103 performs a gradual change process of gradually changing the offset value to decrease the offset value such that the post-switching base axial component $F\Delta\theta$ becomes the original post-switching value. Accordingly, even when the mode is switched between the normal mode and the protection mode, it is possible to curb a rapid change of the processed base axial component $F\Delta\theta'$. When the offset value is not present while the content of the code signal Sm is not switched between the normal mode and the protection mode, the gradual change processing unit 103 calculates the base axial component $F\Delta\theta$ as the processed base axial component $F\Delta\theta'$. In this embodiment, the base axial component calculating unit 101 and the gradual change processing unit 103 correspond to the difference axial component calculating unit. In this embodiment, the processed base axial component $F\Delta\theta$ corresponds to the difference axial component. The acquired processed base axial component $F\Delta\theta'$ is output to an adder 107.

A steering angular velocity $\omega s$ which is acquired by a differentiator 108 by differentiating the steering angle $\theta s$ is input to the viscous axial component calculating unit 102. The steering angular velocity $\omega s$ is set as information indicating a rate of change of the steering angle $\theta s$. Specifically, the viscous axial component calculating unit 102 includes a viscous axial component map in which a relationship between the absolute value of the steering angular velocity $\omega s$ and a viscous axial component $F\omega$ is defined, and calculates the viscous axial component Fω using the map and using the absolute value of the steering angular velocity ωs as an input. One example of the angular velocity in the disclosure is the steering angular velocity ωs.

The viscous axial component calculating unit 102 calculates the viscous axial component Fω such that the absolute value thereof is greater when the absolute value of the steering angular velocity ωs is large than when the absolute value of the steering angular velocity ωs is small. The viscous axial component Fω is set such that the absolute value increases as the steering angular velocity ωs increases. The viscous axial component Fω serves to curb a rapid change of the base axial component FΔθ. That is, the viscous axial component Fω serves to slow down ascent of the difference axial force Fv which is calculated using the base axial component FΔθ. Accordingly, a sense of elasticity of tires when the turning wheels 5 come into contact with an obstacle, a sense of viscosity of tires when the turning wheels 5 are turned, and a sense of stiffness of a mechanical configuration from the turning wheels 5 to the steering wheel 3 are reproduced. The viscous axial component calculating unit 102 outputs the viscous axial component Fω as "0" such that the calculated viscous axial component Fω is not reflected in the base axial component FΔθ when the difference Δθ is less than the difference threshold value, that is, when the base axial component FΔθ is "0."

The adder 107 calculates a combined axial force Ft by adding the viscous axial component Fω to the processed base axial component FΔθ'. The acquired combined axial force Ft is output to the upper limit guard processing unit 104. The vehicle speed value V, the combined axial force Ft, and a maximum value Flim stored in a storage unit 109 are input to the upper limit guard processing unit 104. The storage unit 109 is a predetermined storage area of a memory which is not illustrated. The maximum value Flim is set to, for example, a value in a range which is experimentally acquired as an index indicating the largest value of the combined axial force Ft among values of the combined axial force Ft that do not affect the steering of the steering wheel 3 when the vehicle speed value V is the high vehicle speed.

For example, when the vehicle speed value V is less than a vehicle speed threshold value indicating that the vehicle speed is the low speed, the upper limit guard processing unit 104 outputs the combined axial force Ft as a post-guarding combined axial force Ft'. For example, when the vehicle speed value V is equal to or greater than a vehicle speed threshold value indicating that the vehicle speed is the high speed, the upper limit guard processing unit 104 performs an upper limit guarding process on the combined axial force Ft. For example, when the combined axial force Ft is less than the maximum value Flim while the upper limit guarding process is being performed, the upper limit guard processing unit 104 outputs the combined axial force Ft as the post-guarding combined axial force Ft'. For example, when the combined axial force Ft is equal to or greater than the maximum value Flim while the upper limit guarding process is being performed, the upper limit guard processing unit 104 outputs the maximum value Flim as the post-guarding combined axial force Ft'. The acquired post-guarding combined axial force Ft' is output to a multiplier 110.

The turning-side actual current value Ib is input to the sign processing unit 105. The sign processing unit 105 sets the sign of the post-guarding combined axial force Ft' based on the turning-side actual current value Ib. That is, the sign processing unit 105 outputs "+1" when the turning-side actual current value Ib is a positive value including a zero value, and outputs "−1" when the turning-side actual current value Ib is a negative value. The post-guarding combined axial force Ft' multiplied by the acquired value "1" or "−1" is output as the difference axial force Fv acquired by the multiplier 110, to the axial force selecting unit 74.

Operations of the first embodiment will be described below. The situation of the turning wheels 5 is reflected in the pinion angle θp acquired as information regarding the turning unit 6. For example, when the turning wheels 5 come into contact with an obstacle, the pinion angle θp cannot change toward the obstacle-side (i.e., the side where the obstacle is located) from the pinion angle θp at the time when the turning wheels 5 come into contact with the obstacle. On the other hand, the situation of the steering wheel 3 is reflected in the steering angle θs acquired as information regarding the steering unit 4. For example, when the turning wheels 5 come into contact with an obstacle, the steering angle θs can further change toward the obstacle-side from the steering angle θs at the time when the turning wheels 5 come into contact with the obstacle if an axial force for conveying the situation in which the turning wheels 5 come into contact with the obstacle to a driver is not applied as a steering reaction force. Accordingly, the relationship between the steering angle θs and the pinion angle θp may change. The inventors paid attention to the fact that change of the relationship between the steering angle θs and the pinion angle θp occurs commonly for a certain reason when an axial force for conveying a situation in which the turning wheels 5 come into contact with an obstacle to a driver is set and when another kind of axial force based on a situation of the turning wheels 5 different from the situation in which the turning wheels 5 come into contact with an obstacle is set. That is, the inventors found that a plurality of kinds of axial forces could be considered together when the steering reaction force is determined such that the change of the relationship between the steering angle θs and the pinion angle θp occurring due to a certain reason is not increased or is cancelled out.

Specifically, in this embodiment, the difference axial force Fv is calculated based on the difference Δθ between the steering angle θs and the converted turning angle θp_s. In this case, based on the premise that the steering angle ratio changes, a configuration for converting pinion angle θp to the steering angle θs according to the steering angle ratio is employed when calculating the difference Δθ between the steering angle θs and the converted turning angle θp_s, by considering that the steering angle θs and the pinion angle θp do not correspond to each other in one to one. Accordingly, when the relationship between the steering angle θs and the pinion angle θp changes (deviates), the difference Δθ between the steering angle θs and the converted turning angle θp_s can be calculated as a deviation in which the steering angle ratio at that time is also reflected. When the base axial component FΔθ, that is, the difference axial force Fv, is set based on the difference Δθ between the steering angle θs and the converted turning angle θp_s, a plurality of kinds of axial forces can be considered together and thus the axial forces do not need to be individually set in the respective situations in which the axial forces need to be generated.

Advantages of the first embodiment will be described below. (1-1) For example, since the axial forces do not need to be individually set in the respective situations in which the axial forces need to be generated such as a situation in which the turning wheels 5 come into contact with an obstacle such as a curbstone and a situation in which the output power of the turning-side motor 33 is limited for protection from overheating, it is possible to curb complication of setting of the axial forces which are considered to determine the steering reaction force.

(1-2) Since the viscous axial component Fω is calculated such that the change amount of the base axial component FΔθ decreases as the absolute value of the steering angular velocity ωs increases, it is possible to curb a rapid change of the difference axial force Fv. In this case, it is possible to more accurately conveying a situation which occurs actually in the turning wheels 5 to a driver while conveying the steering reaction force to the driver, for example, reproducing a sense of elasticity of tires when the turning wheels 5 come into contact with an obstacle, a sense of viscosity of tires when the turning wheels 5 are turned, and a sense of stiffness of a mechanical configuration from the turning wheels 5 to the steering wheel 3. Regarding the sense of stiffness of a mechanical configuration from the turning wheels 5 to the steering wheel 3, a sense of stiffness when a power transmission path between the steering unit 4 and the turning unit 6 is connected may be reproduced. In this case, it is possible to reproduce the same sense of stiffness of the turning wheels 5 as when the steering system 2 is a steering system in which the steering unit 4 and the turning unit 6 are normally mechanically connected while conveying the steering reaction force to a driver. It is possible to gradually return the steering wheel 3 to the neutral position when a driver releases his/her hand from the steering wheel 3 or when a force for gripping the steering wheel 3 is decreased.

(1-3) An actual vehicle turning behavior may become different from an ideal vehicle turning behavior in a turning traveling state. The actual vehicle turning behavior may include, for example, a vehicle turning behavior in an under-steered state and a vehicle turning behavior in an over-steered state. Therefore, according to this embodiment, the difference axial force calculating unit 73 calculates the difference Δθ using the post-compensation pinion angle θp' for which compensation has been performed based on the drift state quantity θx. Accordingly, for example, in an over-steered state, a range of adjustment of the manner of conveying the steering reaction force can be increased. For example, the steering reaction force may be determined such that a situation in which the pinion angle θp is slightly small with respect to the state of the turning wheels 5 is conveyed to a driver.

(1-4) The manner in which the magnitude of the difference Δθ between the steering angle θs and the converted turning angle θp_s appears may change due to a change of followability (responsiveness) of the pinion angle θp according to whether the operation of a turning-side motor 33 is to be limited or not to be limited. In this case, a base axial component which is reflected in the difference axial force Fv is switched between the base axial component FΔθ acquired from the base axial component map for the normal mode and the base axial component FΔθ acquired from the base axial component map for the protection mode according to whether the operation of the turning-side motor 33 is to be limited or not to be limited. Accordingly, it is possible to calculate an appropriate difference axial force Fv depending on whether the operation of the turning-side motor 33 is to be limited or not.

(1-5) When the base axial component map for calculating the base axial component is switched due to switching between the state in which the operation of the turning-side motor 33 is not to be limited and the state in which the operation of the turning-side motor 33 is to be limited, it is possible to gradually decrease a difference even if there is the difference before and after the switching. Accordingly, it is possible to curb a rapid change of the difference axial force Fv according to whether the operation of the turning-side motor 33 is to be limited or not to be limited (i.e., it is possible to reduce the possibility that the difference axial force Fv rapidly changes according to whether the operation of the turning-side motor 33 is to be limited or not to be limited).

(1-6) In the situation in which the protection mode is performed, it is possible to take measures when the difference Δθ is small such that the difference Δθ between the steering angle θs and the converted turning angle θp_s is less likely to increase due to a decrease in followability (responsiveness) of the pinion angle θp.

(1-7) In the situation in which the normal mode is performed, a situation in which the gradient of the base axial component FΔθ with respect to the difference Δθ increases does not occur if the difference Δθ does not increase to a certain extent and the dead band of the difference Δθ is large in comparison with the situation in which the protection mode is performed. Accordingly, in the situation in which the normal mode is performed, the difference axial force Fv is calculated according to a small difference Δθ and thus it is possible to prevent a driver's steering operation from being hindered.

(1-8) When the target pinion angle θp* becomes greater than the threshold angle θie, the end axial force calculating unit 72 determines that the steering angle θs exceeds the steering angle limit and calculates the end axial force Fie based on the target pinion angle θp*. When the steering angle θs exceeds the steering angle limit, steering for turning the turning wheels 5 in the direction in which the steering wheel 3 is steered beyond the steering angle limit can be limited by setting the end axial force Fie separately from the difference axial force Fv. Accordingly, for example, when the steering wheel 3 reaches the steering angle limit, it is possible to limit steering of the steering wheel 3 regardless of the magnitude of the difference Δθ between the steering angle θs and the converted turning angle θp_s.

(1-9) Both the difference axial force Fv and the end axial force Fie may be calculated as values for generating the steering reaction force. In this case, only one axial force having the largest absolute value is actually reflected in the target reaction torque Ts*. Accordingly, even when both the difference axial force Fv and the end axial force Fie are calculated as values for generating the steering reaction force, it is possible to prevent the steering reaction force from increasing excessively.

(1-10) The turning-side control unit 60 in which the steering angle ratio change control unit 62 is provided includes the steering angle converting unit 65. In this case, the functions for performing the conversion using the steering angle ratio can be integrated in the turning-side control unit 60. Thus, it is possible to realize a configuration for facilitating design of the control units.

(1-11) For example, when the vehicle is traveling at the high vehicle speed and the difference axial force Fv increases excessively, the steering of the steering wheel 3 may be affected. According to this embodiment, when the vehicle speed value V is equal to or greater than the vehicle speed threshold value, for example, when the vehicle is traveling at the high vehicle speed, and the combined axial force Ft is equal to or greater than the maximum value Flim, the upper limit guard processing unit 104 guards the combined axial force Ft using the maximum value Flim. Accordingly, for example, when the vehicle is traveling at the high vehicle speed, it is possible to curb an influence of the difference axial force Fv on the steering of the steering wheel 3.

(1-12) Since the relationship between the difference 40 and the difference axial force Fv has only to be set, it is possible to curb an increase in storage capacity of the ROM or the like of the steering control device 1 in comparison with a case in which the relationship is individually set and each of the axial forces is set.

Second Embodiment

A steering control device according to a second embodiment will be described below with reference to the accompanying drawings. Differences from the first embodiment will be mainly described below. The same elements as in the first embodiment will be referred to by the same reference signs or the like and description thereof will not be repeated.

Figure 6:
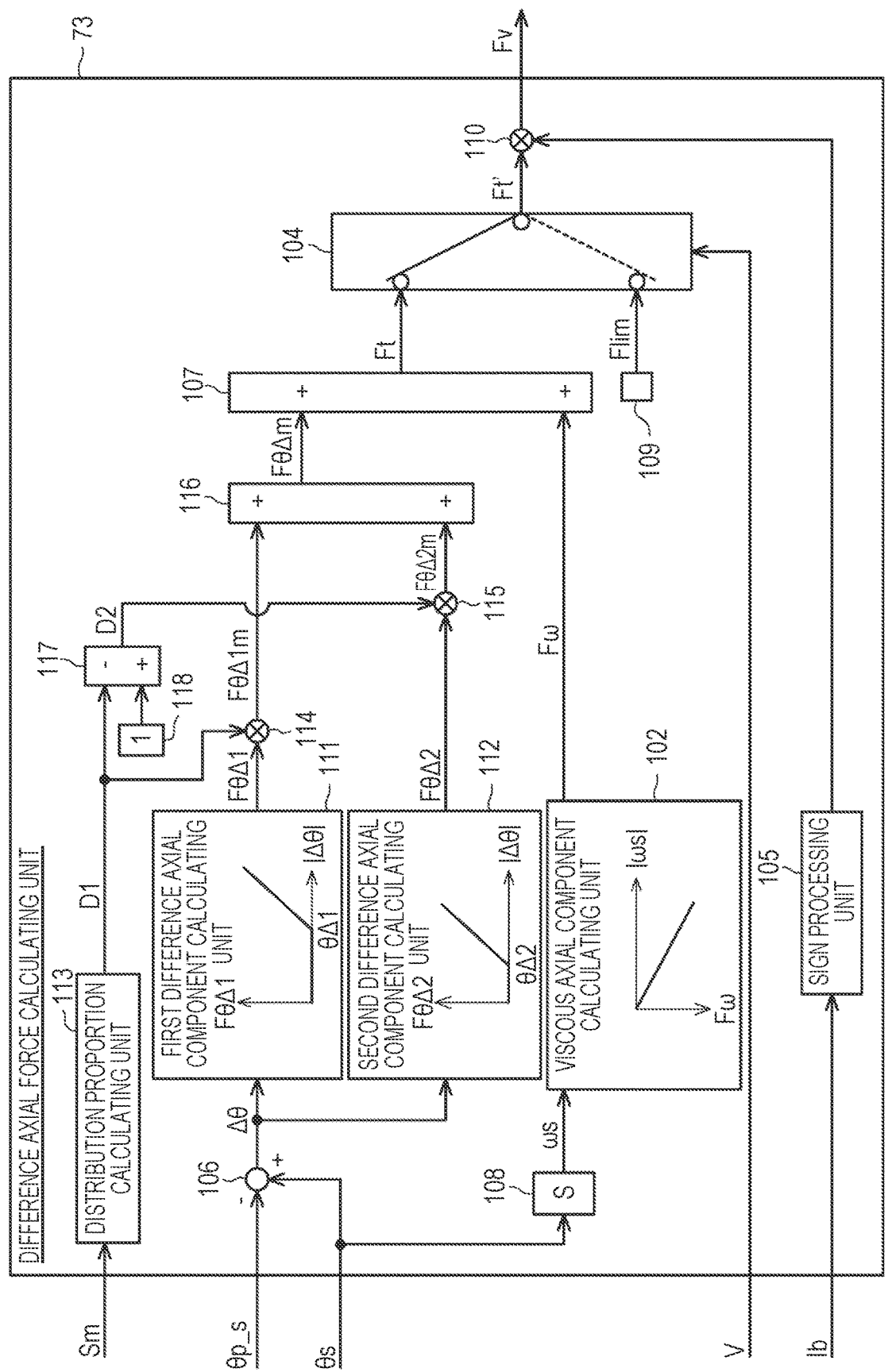
FIG. 6 is a block diagram illustrating functions of a difference axial force calculating unit according to a second embodiment.

As illustrated in FIG. 6, the difference axial force calculating unit 73 according to this embodiment includes a first difference axial component calculating unit 111, a second difference axial component calculating unit 112, and a distribution proportion calculating unit 113 instead of the base axial component calculating unit 101 and the gradual change processing unit 103 according to the first embodiment.

A difference 40 acquired by a subtractor 106 by subtracting the converted turning angle θp_s from the steering angle θs is input to the first difference axial component calculating unit 111. The first difference axial component calculating unit 111 calculates a first difference axial component FΔθ1 based on the difference Δθ. The first difference axial component calculating unit 111 includes a map exhibiting the same tendency as that of the base axial component map for the normal mode indicated by the alternate long and two short dashes line in FIG. 5, and calculates the first difference axial component FΔθ1 using the map and using the difference 40 as an input. The acquired first difference axial component FΔθ1 is output to a multiplier 114.

The difference 40 acquired by the subtractor 106 by subtracting the converted turning angle θp_s from the steering angle θs is input to the second difference axial component calculating unit 112. The second difference axial component calculating unit 112 calculates a second difference axial component FΔθ2 based on the difference Δθ. The second difference axial component calculating unit 112 includes a map exhibiting the same tendency as that of the base axial component map for the protection mode indicated by the solid line in FIG. 5, and calculates the second difference axial component FΔθ2 using the map and using the difference 40 as an input. The acquired second difference axial component FΔθ2 is output to a multiplier 115.

A code signal Sm is input to the distribution proportion calculating unit 113. The distribution proportion calculating unit 113 calculates a first distribution gain D1 based on the code signal Sm. The first distribution gain D1 is a distribution proportion of the first difference axial component FΔθ1 when a difference axial component FΔθm is acquired by summing the first difference axial component FΔθ1 and the second difference axial component FΔθ2 at predetermined distribution proportions.

The first difference axial component FΔθ1 acquired by the first difference axial component calculating unit 111 is multiplied by the acquired first distribution gain D1 to acquire a final first difference axial component FΔθ1m at the multiplier 114, and the final first difference axial component FΔθ1m is output to an adder 116. A subtractor 117 calculates a second distribution gain D2 by subtracting the first distribution gain D1 from "1" stored in the storage unit 118. The acquired second distribution gain D2 is output to the multiplier 115. The second distribution gain D2 is a distribution proportion of the second difference axial component FΔθ2 when the difference axial component FΔθm is acquired by summing the first difference axial component FΔθ1 and the second difference axial component FΔθ2 at predetermined distribution proportions. The second distribution gain D2 is calculated such that the sum of the first distribution gain D1 and the second distribution gain D2 is "1 (100%)." The distribution proportions of the first distribution gain D1 and the second distribution gain D2 are set to appropriate values depending on a situation in which the operation of the turning-side motor 33 is limited, product specifications, and the like. The storage unit 118 is a predetermined storage area of a memory which is not illustrated.

The second difference axial component FΔθ2 acquired by the second difference axial component calculating unit 112 is multiplied by the acquired second distribution gain D2 to acquire a final second difference axial component FΔθ2m at the multiplier 115, and the final second difference axial component FΔθ2m is output to the adder 116. The acquired second difference axial component FΔθ2m and the first difference axial component FΔθ1m are summed at the predetermined distribution proportions to acquire the difference axial component FΔθm at the adder 116, and the difference axial component FΔθm is output to the adder 107.

In this embodiment, the first difference axial component calculating unit 111, the second difference axial component calculating unit 112, the distribution proportion calculating unit 113, the multipliers 114 and 115, the adder 116, the subtractor 117, and the storage unit 118 correspond to the difference axial component calculating unit.

The distribution proportion calculating unit 113 will be described below in detail. A specific example of setting the distribution proportions of the first distribution gain D1 and the second distribution gain D2 is as follows. When the code signal Sm indicating the code "0" is input, that is, in the normal state in which the operation of the turning-side motor 33 is not limited, the distribution proportion calculating unit 113 calculates the first distribution gain D1 such that the distribution gains D1 and D2 become distribution proportions expressed by the following Expression (1).

$$D1:D2=1(100\%):0(0\%) \tag{1}$$

In this case, the first distribution gain D1 is set to "1 (100%)" and the second distribution gain D2 is set to "zero (0%)." Accordingly, when the code signal Sm indicating the code "0" is input, it means that only the first difference axial component FΔθ1 out of the first difference axial component FΔθ1 and the second difference axial component FΔθ2 is reflected in the difference axial force Fv, that is, the second difference axial component FΔθ2 is not reflected. That is, the distribution proportions in this embodiment include a concept of a zero value in which only one of the first difference axial component FΔθ1 and the second difference axial component FΔθ2 is reflected in the difference axial force Fv.

The distribution proportion calculating unit 113 sets the first distribution gain D1 to a smaller value (i.e., such that the first distribution gain D1 decreases) as the overheated state indicated by the code signal Sm transitions in the order of "slight," "intermediate," and "severe," that is, as the turning-side motor 33 becomes more overheated. In this case, the second distribution gain D2 is set to a larger value (i.e., such that the second distribution gain D2 increases) as the overheated state indicated by the code signal Sm transitions in the order of "slight," "intermediate," and "severe."

When the code signal Sm indicating the code "1A" is input, that is, when the turning-side motor 33 is in the slightly overheated state, the distribution proportion calculating unit 113 calculates the first distribution gain D1 such that the distribution gains D1 and D2 become distribution proportions expressed by the following Expression (2).

$$D1:D2=0.8(80\%):0.2(20\%) \quad (2)$$

When the code signal Sm indicating the code "1B" is input, that is, when the turning-side motor 33 is in the intermediately overheated state, the distribution proportion calculating unit 113 calculates the first distribution gain D1 such that the distribution gains D1 and D2 become distribution proportions expressed by the following Expression (3).

$$D1:D2=0.2(20\%):0.8(80\%) \quad (3)$$

When the code signal Sm indicating the code "1C" is input, that is, when the turning-side motor 33 is in the severely overheated state, the distribution proportion calculating unit 113 calculates the first distribution gain D1 such that the distribution gains D1 and D2 become distribution proportions expressed by the following Expression (4).

$$D1:D2=0(0\%):1(100\%) \quad (4)$$

The distribution proportion calculating unit 113 may set the first distribution gain D1 to a smaller value (i.e., such that the first distribution gain D1 decreases) as the voltage-dropped state indicated by the code signal Sm transitions in the order of "slight," "intermediate," and "severe." In this case, when the code signal Sm indicating the code "2A" is input, the distribution proportion calculating unit 113 calculates the first distribution gain D1 such that the same distribution proportion as when the code signal Sm indicating the code "1A" is input is acquired. When the code signal Sm indicating the code "2B" is input, the distribution proportion calculating unit 113 calculates the first distribution gain D1 such that the same distribution proportion as when the code signal Sm indicating the code "1B" is input is acquired. When the code signal Sm indicating the code "2C" is input, the distribution proportion calculating unit 113 calculates the first distribution gain D1 such that the same distribution proportion as when the code signal Sm indicating the code "1C" is input is acquired.

The distribution proportion calculating unit 113 has a function of gradually changing the distribution gain D1 when the distribution gain D1 is changed. When the distribution gain D1 is changed, the distribution proportion calculating unit 113 performs a gradual change process with respect to time on the distribution gain D1. Specifically, when the code is switched, the distribution proportion calculating unit 113 gradually changes the distribution gain D1 with the elapsed time from a pre-switching value to a post-switching value. For example, the same method as in the gradual change processing unit 103 in the first embodiment may be used as the method of gradually changing the distribution gain D1. In this case, when the code is switched, the distribution proportion calculating unit 113 acquires a difference between the distribution gain D1 calculated before the switching and the post-switching distribution gain D1 calculated after the switching, and calculates the difference as an offset value. The distribution proportion calculating unit 113 calculates the processed distribution gain D1 by shifting the post-switching distribution gain D1 toward the pre-switching distribution gain D1 by the offset value.

The distribution proportion calculating unit 113 gradually changes the offset value with time such that the post-switching distribution gain D1 becomes the original post-switching value eventually.

According to this embodiment, operations and advantages corresponding to those in the first embodiment are achieved. According to this embodiment, the following advantages are additionally achieved. (2-1) The distribution proportions of the first difference axial component $F\Delta\theta1$ and the second difference axial component $F\Delta\theta2$ are changed according to whether the operation of the turning-side motor 33 is to be limited or not to be limited. Accordingly, it is possible to calculate an appropriate difference axial force Fv depending on whether the operation of the turning-side motor 33 is to be limited or not to be limited.

(2-2) When the distribution proportions are changed due to switching between the state in which the operation of the turning-side motor 33 is not to be limited and the state in which the operation of the turning-side motor 33 is to be limited, it is possible to gradually reflect the change. Accordingly, it is possible to curb a rapid change of the difference axial force Fv according to whether the operation of the turning-side motor 33 is to be limited or not to be limited.

The aforementioned embodiments may be modified as follows. The following modified examples can be combined unless technical conflictions arise. In the aforementioned embodiments, the steering angle converting unit 65 may be set as a function of the steering-side control unit 50. The steering angle ratio change control unit 62 along with the function of the steering angle converting unit 65 may be set as a function of the steering-side control unit 50. In this case, the advantage corresponding to the advantage (1-10) in the first embodiment can be achieved.

In the aforementioned embodiments, the axial force selecting unit 74 may be deleted. In this case, for example, the axial force F can be acquired by the adder 75 by summing the distributed axial force Fd calculated by the distributed axial force calculating unit 71, the end axial force Fie calculated by the end axial force calculating unit 72, and the difference axial force Fv calculated by the difference axial force calculating unit 73.

In the aforementioned embodiments, the axial force calculating unit 56 may have a function of calculating an additional axial force for conveying the situation of the turning wheels 5 in addition to the distributed axial force calculating unit 71, the end axial force calculating unit 72, and the difference axial force calculating unit 73. In this case, the axial force selecting unit 74 selects an axial force having the largest absolute value out of the end axial force Fie, the difference axial force Fv, and the additional axial force and calculates the selected axial force as the selected axial force Fsl.

In the aforementioned embodiments, the host control device 45 generates the drive state quantity $\theta x$ which is a value with the dimension of an angle (i.e., the angular dimension) as a turning state quantity, but the disclosure is not limited thereto and a drift state quantity with the dimension of a torque may be generated as the turning state quantity. In this case, the drift state quantity with the dimension of a torque is converted to a value with the dimension of an angle. Then, a post-compensation pinion angle $\theta p'$ which is acquired by the subtractor 68 by subtracting the drift state quantity from the pinion angle $\theta p$ is output to the steering angle converting unit 65.

In the aforementioned embodiments, the function of calculating the drift state quantity $\theta x$ may be set as a function of the steering control device 1, that is, as a function of the steering-side control unit 50 or the turning-side control unit 60. In the aforementioned embodiments, the drift state quantity θx generated by the host control device 45 may not be input to the steering control device 1. In this case, the subtractor 68 can be deleted from the turning-side control unit 60. That is, the pinion angle θp calculated by the pinion angle calculating unit 61 is input to the steering angle converting unit 65, and the pinion angle θp is used to calculate the converted turning angle θp_s.

In the first embodiment, the code signal generating unit 66 may detect a mechanical abnormality of the constituents of the turning unit 6 such as the turning-side motor 33 based on the results of detection from various kinds of sensors. In this case, the code signal generating unit 66 generates the code signal Sm indicating that the protection mode is to be performed, for example, when it is determined that a mechanical abnormality has occurred in the turning-side motor 33.

In the aforementioned embodiments, the pinion angle feedback control unit 63 may perform PID control using a proportional term, an integral term, and a differential term as feedback control of the pinion angle θp. In this case, if the difference axial force Fv is calculated according to a small difference Δθ appearing while the pinion angle θp is caused to conform to the target pinion angle θp* calculated based on the steering angle θs, a driver's steering operation is hindered. This is the same as in the aforementioned embodiments.

In the first embodiment, the gradual change processing unit 103 may be deleted from the difference axial force calculating unit 73. In this case, the base axial component FΔθ calculated by the base axial component calculating unit 101 is output to the adder 107 regardless of switching of the mode between the normal mode and the protection mode.

In the aforementioned embodiments, the axial force calculating unit 56 calculates at least the difference axial force Fv as the axial force F. In this case, the end axial force calculating unit 72 may be deleted. In the aforementioned embodiments, the viscous axial component calculating unit 102 may calculate the viscous axial component Fω in consideration of a parameter other than the steering angular velocity ωs. For example, the viscous axial component calculating unit 102 may calculate the viscous axial component Fω in consideration of the vehicle speed value V. In this case, for example, the viscous axial component calculating unit 102 may include a plurality of maps having different tendencies with respect to the vehicle speed value V and calculate the viscous axial component Fω with reference to the map selected according to the vehicle speed value V.

In the aforementioned embodiments, the viscous axial component calculating unit 102 may use a pinion angular velocity which is a rate of change of the pinion angle θp instead of the steering angular velocity ωs at the time of calculating the viscous axial component Fω. A target pinion angular velocity which is a rate of change of the target pinion angle θp* may be used to calculate the viscous axial component Fω. A converted turning angular velocity which is a rate of change of the converted turning angle θp_s which is a converted angle may be used to calculate the viscous axial component Fω. In this modified example, examples of the angular velocity in the disclosure include the pinion angular velocity, the target pinion angular velocity, and the converted turning angular velocity. When this modified example is employed, information on the viscous axial component Fω may be calculated by the turning-side control unit 60 and the information may be conveyed to the steering-side control unit 50.

In the aforementioned embodiments, the viscous axial component calculating unit 102 may reflect the viscous axial component Fω in the base axial component FΔθ when the difference Δθ is less than the difference threshold value. In the aforementioned embodiments, the viscous axial component calculating unit 102 may be deleted from the difference axial force calculating unit 73. In this case, the adder 107 can be deleted from the difference axial force calculating unit 73. That is, the processed base axial component FΔθ' calculated by the gradual change processing unit 103 is output to the upper limit guard processing unit 104.

In the first embodiment, the base axial component calculating unit 101 may include one kind of map or three or more kinds of maps as the base axial component map. When three or more kinds of maps are provided as the base axial component map, the base axial component calculating unit 101 may calculate the base axial component FΔθ using a map based on the state indicated by the code such as the map corresponding to the code "0," the maps corresponding to the codes "1A," "1B," "2A," and "2B," or the maps corresponding to the codes "1C" and "2C."

In the second embodiment, the difference axial force calculating unit 73 may include three or more difference axial component calculating units. In this case, the difference axial force calculating unit 73 may sum the three or more difference axial components at predetermined distribution proportions using distribution gains based on the state indicated by the code such as the distribution gains corresponding to the code "0," the distribution gains corresponding to the codes "1A," "1B," "2A," and "2B," or the distribution gains corresponding to the codes "1C" and "2C."

In the second embodiment, the sum of the first distribution gain D1 and the second distribution gain D2 may be greater than "1 (100%)." The same applies when the difference axial force calculating unit 73 calculates three or more distribution gains as in the aforementioned modified example, and the sum of the three or more distribution gains may be greater than "1 (100%)."

In the first embodiment, the base axial component calculating unit 101 uses the difference Δθ between the steering angle θs as the reference angle and the converted turning angle θp_s as the converted angle to calculate the base axial component FΔθ, but the disclosure is not limited thereto. For example, a difference between a target pinion angle θp* as the reference angle and a converted turning angle θp_s as the converted angle may be used to calculate the difference Δθ. In addition, a difference between a value which is obtained by converting the steering angle θs such that it is expressed as a value of an index of the pinion angle θp according to the steering angle ratio as the reference angle and the pinion angle θp as the converted angle may be used to calculate the difference Δθ. A difference between the pinion angle θp as the reference angle and the target pinion angle θp* as the converted angle may be used to calculate the difference Δθ. In this case, the steering angle converting unit 65 can be deleted from the turning-side control unit 60. The same applies in the second embodiment.

In the aforementioned embodiments, the difference axial force calculating unit 73 may be set as a function of the turning-side control unit 60. The axial force calculating unit 56 in addition to the difference axial force calculating unit 73 may be set as a function of the turning-side control unit 60. In this case, the axial force F calculated by the axial force calculating unit 56 provided in the turning-side control unit 60 is output to the target reaction torque calculating unit 52 of the steering-side control unit 50.

In the aforementioned embodiments, the code signal generating unit 66 may be set as a function of the steering-side control unit 50. In this case, the results of detection from the temperature sensor, the voltage sensor, and the like detected by the turning-side control unit 60 are output to the code signal generating unit provided in the steering-side control unit 50.

In the second embodiment, the distribution proportion calculating unit 113 may calculate the first distribution gain D1 and the second distribution gain D2 based on the code signal Sm. In this case, the subtractor 117 and the storage unit 118 can be deleted. In this way, the difference axial component calculating unit includes at least the first difference axial component calculating unit 111, the second difference axial component calculating unit 112, and the distribution proportion calculating unit 113 and the other configuration can be appropriately modified.

In the first embodiment, the gradient of the base axial component $F\Delta\theta$ with respect to the difference $\Delta\theta$ may be set to be different between the base axial component maps. For example, the gradient in the base axial component map for the protection mode be increased. In this case, in the base axial component maps, the first difference threshold value $\Delta\theta1$ and the second difference threshold value $\Delta\theta2$ may be set to the same value and the dead bands of the difference $\Delta\theta$ may be set to the same range. The same applies to the difference axial component maps in the second embodiment.

In the second embodiment, the distribution proportion calculating unit 113 may not have the function of gradually changing the distribution gain D1. In this case, the first distribution gain D1 calculated by the distribution proportion calculating unit 113 is output to the multiplier 114 and the subtractor 117 regardless of switching of the code.

In the first embodiment, a plurality of situations in which the operation of the turning-side motor 33 is to be limited may occur simultaneously. For example, a situation in which the operation of the turning-side motor 33 is to be limited in view of the heated state of the turning-side motor 33 and a situation in which the operation of the turning-side motor 33 is to be limited in view of the voltage state of the DC power supply may occur simultaneously. For the purpose of coping therewith, the codes may be prioritized, for example, the code indicating the heated state of the turning-side motor 33 may be more preferentially reflected than the code indicating the voltage state of the DC power supply. The same applies to the second embodiment.

In the first embodiment, the operation of the turning-side motor 33 may not be limited in the slightly overheated state or the slightly voltage-dropped state. That is, setting of states to the normal mode and the protection modes for limiting the operation of the turning-side motor 33 can be appropriately changed. The same applies to the second embodiment.

In the aforementioned embodiments, the angle axial force calculating unit 81 uses at least the target pinion angle $\theta p^*$ to calculate the angle axial force Fr, and may not use the vehicle speed value V or may use a combination with another parameter. The angle axial force calculating unit 81 may use the pinion angle $\theta p$ instead of the target pinion angle $\theta p^*$. This is because use of the pinion angle $\theta p$ has the same concept as using the target pinion angle $\theta p^*$.

In the aforementioned embodiments, the current axial force calculating unit 82 uses at least the turning-side actual current value Ib to calculate the current axial force Fi and may use a combination with another parameter such as the vehicle speed value V. The current axial force calculating unit 82 may use a current command value which is obtained to cancel out a difference from a current value on the d-q coordinate system acquired by converting the turning-side actual current value Ib based on the turning-side rotation angle $\theta b$, instead of the turning-side actual current value Ib. This is because use of the current command value has the same concept as using the turning-side actual current value Ib.

In the aforementioned embodiments, the distribution proportion calculating unit 83 may use another parameter such as the pinion angle $\theta p$, the target pinion angle $\theta p^*$, the steering angle $\theta s$, or a turning speed acquired by differentiating the pinion angle $\theta p$ to calculate the distribution gain Di instead of or in addition to the vehicle speed value V.

In the aforementioned embodiments, the angle axial force calculating unit 81 or the current axial force calculating unit 82 may be deleted from the distributed axial force calculating unit 71. In this case, the distribution proportion calculating unit 83 may be deleted. The angle axial force Fr calculated by the angle axial force calculating unit 81 or the current axial force Fi calculated by the current axial force calculating unit 82 is output to the adder 75.

In the aforementioned embodiments, the end axial force calculating unit 72 may use a combination with another parameter such as the vehicle speed value V to calculate the end axial force Fie. The end axial force calculating unit 72 may use the pinion angle $\theta p$ instead of the target pinion angle $\theta p^*$. This is because use of the pinion angle $\theta p$ has the same concept as using the target pinion angle $\theta p^*$.

In the aforementioned embodiments, the steering force calculating unit 55 uses at least a state quantity associated with the operation of the steering wheel 3 to calculate the steering force Tb* and may not use the vehicle speed value V or may use a combination with another parameter. As the state quantity associated with the operation of the steering wheel 3, the steering angle $\theta s$ or another parameter may be used instead of the steering torque Th described in the aforementioned embodiments.

In the aforementioned embodiments, the turning-side control unit 60 may be provided as a function of the steering-side control unit 50. In the aforementioned embodiments, the turning-side motor 33 may employ, for example, a configuration in which the turning-side motor 33 is disposed coaxially with the rack shaft 22 or a configuration in which the turning-side motor 33 is connected to the rack shaft 22 via a belt type speed reducer using a ball screw mechanism.

In the aforementioned embodiments, the steering control device 1 can be configured as a processing circuit including (1) one or more processors that operate in accordance with a computer program (software), (2) one or more dedicated hardware circuits such as an application-specific integrated circuit (ASIC) that performs at least some of various processes, or (3) a combination thereof. The processor includes a central processing unit (CPU) and memories such as a RAM and a ROM, and the memories store program codes or commands configured to cause the CPU to perform processing. Memories, that is, non-transitory computer-readable media, include all available media that can be accessed by a general-purpose or dedicated computer.

In the aforementioned embodiments, the steering system 2 employs a linkless structure in which the steering unit 4 and the turning unit 6 are normally mechanically disconnected from each other, but the disclosure is not limited thereto and the steering system may employ a structure in which the steering unit 4 and the turning unit 6 can be mechanically disconnected by a clutch 25 as indicated by an alternate long and two short dashes line in FIG. 1.

What is claimed is:

1. A steering control device configured to control a steering system that has a structure in which a power transmission path between a steering unit that is connected to a steering wheel and a turning unit that turns turning wheels by an operation of a turning shaft according to steering input to the steering unit is cut off, the steering system having a function of changing a steering angle ratio which is a ratio of an amount of rotation of the turning wheels to an amount of rotation of the steering wheel, the steering control device comprising:
   a control unit configured to control at least an operation of a steering-side motor which is provided in the steering unit such that a steering reaction force which is a force against the steering input to the steering unit is generated,
   wherein the control unit is configured to:
      calculate a target reaction torque which is a target value of a motor torque of the steering-side motor, the motor torque serving as the steering reaction force;
      calculate a difference axial force that is used to limit steering for turning the turning wheels in a predetermined direction, the difference axial force being reflected in the target reaction torque; and
      set a reference angle to one of a steering angle which is set as a value indicating the amount of rotation of the steering wheel and a turning angle which is set as a value indicating the amount of rotation of the turning wheels, set a converted angle to an angle which is obtained by converting another of the steering angle and the turning angle according to the steering angle ratio, and calculate the difference axial force based on a difference between the reference angle and the converted angle, wherein
   a turning state quantity which is set as information indicating a difference between an ideal vehicle turning behavior and an actual vehicle turning behavior is input to the control unit; and
   the control unit is configured to calculate the difference between the reference angle and the converted angle using the turning angle for which compensation has been performed based on the turning state quantity.

2. The steering control device according to claim 1, wherein:
   the control unit is configured to:
      calculate a difference axial component based on the difference between the reference angle and the converted angle;
      calculate a viscous axial component based on an angular velocity which is a rate of change of the reference angle or the converted angle, so as to adjust a change of the difference axial force; and
      acquire the difference axial force by reflecting the viscous axial component in the difference axial component.

3. The steering control device according to claim 1, wherein:
   the control unit is configured to sum a plurality of difference axial components including a first difference axial component which is acquired based on the difference between the reference angle and the converted angle, and a second difference axial component which is acquired based on the difference between the reference angle and the converted angle such that the second difference axial component has a different characteristic from a characteristic of the first difference axial component, at predetermined distribution proportions; and
   the control unit is configured to change the distribution proportions depending on whether an operation of a turning-side motor which is provided in the turning unit is to be limited or not to be limited, and to reflect the difference axial components which are summed at the distribution proportions in the difference axial force.

4. The steering control device according to claim 3, wherein the control unit is configured to have a function of gradually changing the distribution proportions at a time of changing the distribution proportions due to switching between a state in which the operation of the turning-side motor is not to be limited and a state in which the operation of the turning-side motor is to be limited.

5. The steering control device according to claim 1, wherein:
   the control unit is configured to calculate an end axial force for limiting steering in a direction in which a steering angle limit is exceeded; and
   the control unit is configured to have a function of separately calculating the difference axial force and the end axial force.

6. The steering control device according to claim 5, wherein:
   the control unit is configured to select an axial force having a largest absolute value out of a plurality of axial forces including the difference axial force and the end axial force; and
   the control unit is configured to acquire the target reaction torque by reflecting the selected axial force in the target reaction torque.

7. The steering control device according to claim 1, wherein:
   the control unit is configured to perform reaction control such that the steering reaction force is generated by performing driving control for the steering-side motor and to perform turning control such that the turning wheels are turned by performing driving control for a turning-side motor which is provided in the turning unit;
   the control unit is configured to perform control such that the steering angle ratio is changed based on a vehicle speed value which is set as information indicating a travel speed of a vehicle and to calculate a converted turning angle which is obtained by converting the turning angle to the steering angle according to the steering angle ratio;
   the reference angle is the steering angle; and
   the converted angle is the converted turning angle.

8. The steering control device according to claim 1, wherein:
   the control unit is configured to calculate a plurality of difference axial components including a first difference axial component which is acquired based on the difference between the reference angle and the converted angle, and a second difference axial component which is acquired based on the difference between the reference angle and the converted angle such that the second difference axial component has a different characteristic from a characteristic of the first difference axial component; and
   the control unit is configured to reflect one of the first difference axial component and the second difference axial component in the difference axial force depending on whether an operation of a turning-side motor which is provided in the turning unit is to be limited or not.

9. The steering control device according to claim 8, wherein the control unit is configured to have a function of gradually decreasing a difference between the first difference axial component and the second difference axial component before and after switching the difference axial component to be reflected in the difference axial force between the first difference axial component and the second difference axial component due to switching between a state in which the operation of the turning-side motor is not to be limited and a state in which the operation of the turning-side motor is to be limited.

10. The steering control device according to claim 8, wherein:
the control unit is configured to set a gradient of the difference axial component with respect to the difference between the reference angle and the converted angle such that the gradient is larger when an absolute value of the difference between the reference angle and the converted angle is equal to or greater than a difference threshold value than when the absolute value of the difference between the reference angle and the converted angle is less than the difference threshold value; and
the control unit is configured to set an absolute value of the difference threshold value such that the absolute value of the difference threshold value is smaller when the operation of the turning-side motor is to be limited than when the operation of the turning-side motor is not to be limited.

11. A steering control device configured to control a steering system that has a structure in which a power transmission path between a steering unit that is connected to a steering wheel and a turning unit that turns turning wheels by an operation of a turning shaft according to steering input to the steering unit is cut off, the steering system having a function of changing a steering angle ratio which is a ratio of an amount of rotation of the turning wheels to an amount of rotation of the steering wheel, the steering control device comprising:
a control unit configured to control at least an operation of a steering-side motor which is provided in the steering unit such that a steering reaction force which is a force against the steering input to the steering unit is generated,
wherein the control unit is configured to:
calculate a target reaction torque which is a target value of a motor torque of the steering-side motor, the motor torque serving as the steering reaction force;
calculate a difference axial force that is used to limit steering for turning the turning wheels in a predetermined direction, the difference axial force being reflected in the target reaction torque; and
set a reference angle to one of a steering angle which is set as a value indicating the amount of rotation of the steering wheel and a turning angle which is set as a value indicating the amount of rotation of the turning wheels, set a converted angle to an angle which is obtained by converting another of the steering angle and the turning angle according to the steering angle ratio, and calculate the difference axial force based on a difference between the reference angle and the converted angle, wherein
the control unit is configured to calculate a plurality of difference axial components including a first difference axial component which is acquired based on the difference between the reference angle and the converted angle, and a second difference axial component which is acquired based on the difference between the reference angle and the converted angle such that the second difference axial component has a different characteristic from a characteristic of the first difference axial component; and
the control unit is configured to reflect one of the first difference axial component and the second difference axial component in the difference axial force depending on whether an operation of a turning-side motor which is provided in the turning unit is to be limited or not.

12. A steering control device configured to control a steering system that has a structure in which a power transmission path between a steering unit that is connected to a steering wheel and a turning unit that turns turning wheels by an operation of a turning shaft according to steering input to the steering unit is cut off, the steering system having a function of changing a steering angle ratio which is a ratio of an amount of rotation of the turning wheels to an amount of rotation of the steering wheel, the steering control device comprising:
a control unit configured to control at least an operation of a steering-side motor which is provided in the steering unit such that a steering reaction force which is a force against the steering input to the steering unit is generated,
wherein the control unit is configured to:
calculate a target reaction torque which is a target value of a motor torque of the steering-side motor, the motor torque serving as the steering reaction force;
calculate a difference axial force that is used to limit steering for turning the turning wheels in a predetermined direction, the difference axial force being reflected in the target reaction torque; and
set a reference angle to one of a steering angle which is set as a value indicating the amount of rotation of the steering wheel and a turning angle which is set as a value indicating the amount of rotation of the turning wheels, set a converted angle to an angle which is obtained by converting another of the steering angle and the turning angle according to the steering angle ratio, and calculate the difference axial force based on a difference between the reference angle and the converted angle, wherein
the control unit is configured to sum a plurality of difference axial components including a first difference axial component which is acquired based on the difference between the reference angle and the converted angle, and a second difference axial component which is acquired based on the difference between the reference angle and the converted angle such that the second difference axial component has a different characteristic from a characteristic of the first difference axial component, at predetermined distribution proportions; and
the control unit is configured to change the distribution proportions depending on whether an operation of a turning-side motor which is provided in the turning unit is to be limited or not to be limited, and to reflect the difference axial components which are summed at the distribution proportions in the difference axial force.

13. A steering control device configured to control a steering system that has a structure in which a power transmission path between a steering unit that is connected to a steering wheel and a turning unit that turns turning wheels by an operation of a turning shaft according to steering input to the steering unit is cut off, the steering system having a function of changing a steering angle ratio which is a ratio of an amount of rotation of the turning wheels to an amount of rotation of the steering wheel, the steering control device comprising:
 a control unit configured to control at least an operation of a steering-side motor which is provided in the steering unit such that a steering reaction force which is a force against the steering input to the steering unit is generated,
 wherein the control unit is configured to:
  calculate a target reaction torque which is a target value of a motor torque of the steering-side motor, the motor torque serving as the steering reaction force;
  calculate a difference axial force that is used to limit steering for turning the turning wheels in a predetermined direction, the difference axial force being reflected in the target reaction torque; and
  set a reference angle to one of a steering angle which is set as a value indicating the amount of rotation of the steering wheel and a turning angle which is set as a value indicating the amount of rotation of the turning wheels, set a converted angle to an angle which is obtained by converting another of the steering angle and the turning angle according to the steering angle ratio, and calculate the difference axial force based on a difference between the reference angle and the converted angle, wherein
 the control unit is configured to calculate an end axial force for limiting steering in a direction in which a steering angle limit is exceeded; and
 the control unit is configured to have a function of separately calculating the difference axial force and the end axial force.

* * * * *